US012803851B2

(12) United States Patent
Duan et al.

(10) Patent No.: US 12,803,851 B2
(45) Date of Patent: Nov. 17, 2026

(54) CHANNEL STITCHING FOR CELLULAR BASED RADIO FREQUENCY SENSING

(71) Applicant: QUALCOMM Incorporated, San Diego, CA (US)

(72) Inventors: Weimin Duan, San Diego, CA (US); Jing Jiang, San Diego, CA (US); Hyojin Lee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 609 days.

(21) Appl. No.: 17/896,331

(22) Filed: Aug. 26, 2022

(65) Prior Publication Data

US 2024/0073072 A1 Feb. 29, 2024

(51) Int. Cl.

*H04L 27/26* (2006.01)
*H04B 17/30* (2015.01)
*H04L 5/00* (2006.01)
*H04W 72/044* (2023.01)

(52) U.S. Cl.

CPC ....... *H04L 27/26025* (2021.01); *H04B 17/30* (2015.01); *H04L 5/0094* (2013.01); *H04W 72/044* (2013.01)

(58) Field of Classification Search

CPC ....... G01S 7/006; G01S 13/003; H04B 17/30; H04L 27/26025; H04L 5/0048; H04L 5/0094; H04W 64/00; H04W 72/044
USPC .......................................................... 370/329
See application file for complete search history.

(56) References Cited

U.S. PATENT DOCUMENTS

2019/0386862 A1* 12/2019 Islam .................. H04L 27/2607
2021/0185632 A1 6/2021 Manolakos et al.
2022/0053424 A1 2/2022 Bao et al.
2022/0256519 A1* 8/2022 Jeon ........................ G01S 13/02
(Continued)

FOREIGN PATENT DOCUMENTS

WO 2018029663 A1 2/2018
WO 2020166898 A1 8/2020
(Continued)

OTHER PUBLICATIONS

Characteristics template for NR RIT of "5G" (Release 15 and beyond); M:\BRSGD\TEXT2018\SG05\WP5D\900\980E.DOCX (Year: 2019).*
(Continued)

*Primary Examiner* — Asad M Nawaz
(74) *Attorney, Agent, or Firm* — PROCOPIO, CORY, HARGREAVES & SAVITCH LLP

(57) ABSTRACT

Techniques are provided for performing channel stitching for cellular based radio frequency (RF) sensing. An example method of determining range information using joint communication and sensing includes receiving assistance data for joint communication and sensing operations, wherein the assistance data includes mixed numerology information indicating at least a first subcarrier spacing and a second subcarrier spacing, performing joint communication and sensing operations utilizing the first subcarrier spacing to receive communication symbols and the second subcarrier spacing to receive radio frequency sensing symbols, performing one or more channel stitching operations based on the received radio frequency sensing symbols, and determining range information based at least in part on the one or more channel stitching operations.

31 Claims, 25 Drawing Sheets

(56) References Cited

U.S. PATENT DOCUMENTS

| | | | | |
|---|---|---|---|---|
| 2023/0370230 | A1* | 11/2023 | Duan | H04L 5/0053 |
| 2024/0183934 | A1* | 6/2024 | Duan | G01S 13/86 |
| 2024/0298279 | A1* | 9/2024 | Liu | H04L 5/005 |
| 2025/0035770 | A1* | 1/2025 | Pakrooh | H04B 1/71635 |

FOREIGN PATENT DOCUMENTS

| | | | | |
|---|---|---|---|---|
| WO | WO-2021197960 | A1 * | 10/2021 | G01S 7/0232 |
| WO | 2022119782 | A1 | 6/2022 | |
| WO | 2022147379 | A1 | 7/2022 | |

OTHER PUBLICATIONS

International Search Report and Written Opinion—PCT/US2023/027999—ISA/EPO—Oct. 18, 2023.

* cited by examiner

CHANNEL STITCHING FOR CELLULAR BASED RADIO FREQUENCY SENSING

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

5G enables the utilization of mmW RF signals for wireless communication between network nodes, such as base stations, user equipment (UEs), vehicles, factory automation machinery, and the like. However, mmW RF signals can be used for other purposes as well. For example, mmW RF signals can be used in weapons systems (e.g., as short-range fire-control radar in tanks and aircraft), security screening systems (e.g., in scanners that detect weapons and other dangerous objects carried under clothing), medicine (e.g., to treat disease by changing cell growth), and the like.

SUMMARY

An example method of determining range information using joint communication and sensing according to the disclosure includes receiving assistance data for joint communication and sensing operations, wherein the assistance data includes mixed numerology information indicating at least a first subcarrier spacing and a second subcarrier spacing, performing joint communication and sensing operations utilizing the first subcarrier spacing to receive communication symbols and the second subcarrier spacing to receive radio frequency sensing symbols, performing one or more channel stitching operations based on the received radio frequency sensing symbols, and determining range information based at least in part on the one or more channel stitching operations.

An example method for receiving range information from a mobile device based on joint communication and sensing according to the disclosure includes providing assistance data for joint communication and sensing operations to the mobile device, wherein the assistance data includes mixed numerology information indicating at least a first subcarrier spacing and a second subcarrier spacing, transmitting symbols for the joint communication and sensing operations utilizing the first subcarrier spacing for communication symbols and the second subcarrier spacing for radio frequency sensing symbols, and receiving range information from the mobile device based at least in part on a plurality of radio frequency sensing symbols transmitted using the second subcarrier spacing.

An example apparatus according to the disclosure includes a memory, at least one transceiver, at least one processor communicatively coupled to the memory and the at least one transceiver, and configure to receive assistance data for joint communication and sensing operations, wherein the assistance data includes mixed numerology information indicating at least a first subcarrier spacing and a second subcarrier spacing, perform joint communication and sensing operations utilizing the first subcarrier spacing to receive communication symbols and the second subcarrier spacing to receive radio frequency sensing symbols, perform one or more channel stitching operations based on the received radio frequency sensing symbols, and determine range information based at least in part on the one or more channel stitching operations.

An example apparatus according to the disclosure includes a memory, at least one transceiver, at least one processor communicatively coupled to the memory and the at least one transceiver, and configured to provide assistance data for joint communication and sensing operations to a mobile device, wherein the assistance data includes mixed numerology information indicating at least a first subcarrier spacing and a second subcarrier spacing, transmit symbols for the joint communication and sensing operations utilizing the first subcarrier spacing for communication symbols and the second subcarrier spacing for radio frequency sensing symbols, and receive range information from the mobile device based at least in part on a plurality of radio frequency sensing symbols transmitted using the second subcarrier spacing.

Items and/or techniques described herein may provide one or more of the following capabilities, as well as other capabilities not mentioned. A wireless node may be capable of transmitting and/or receiving radio frequency (RF) sensing signals. The wireless node may utilize the same receivers for both communications and RF sensing operations. The RF sensing signals may be based on reference signal waveforms and may utilize an increased bandwidth as compared to other communications signals. Joint communication and sensing (JCS) operations may utilize a mixed numerology with a plurality of subcarrier spacing (SCS). A first SCS may be used to transmit and receive communication and data payloads. A second SCS, which is larger than the first SCS, may be used for RF sensing symbols. Channel stitching may be used for RF sensing symbols to increase the accuracy of range estimates. Assistance data including the mixed numerology configuration information may be provided to mobile devices via over-the-air messaging. Tuning gaps may be used to enable legacy mobile devices to retune based on the RF sensing symbols. Intra-symbol multiplexing may be used to increase the number of stations transmitting and receiving the RF sensing symbols. The accuracy of range estimates may be increased. The latency associated with determining a range to a target may be reduced. Other capabilities may be provided and not every implementation according to the disclosure must provide any, let alone all, of the capabilities discussed.

BRIEF DESCRIPTION OF THE DRAWINGS

The accompanying drawings are presented to aid in the description of examples of one or more aspects of the disclosed subject matter and are provided solely for illustration of the examples and not limitations thereof.

DETAILED DESCRIPTION

Figure 1:
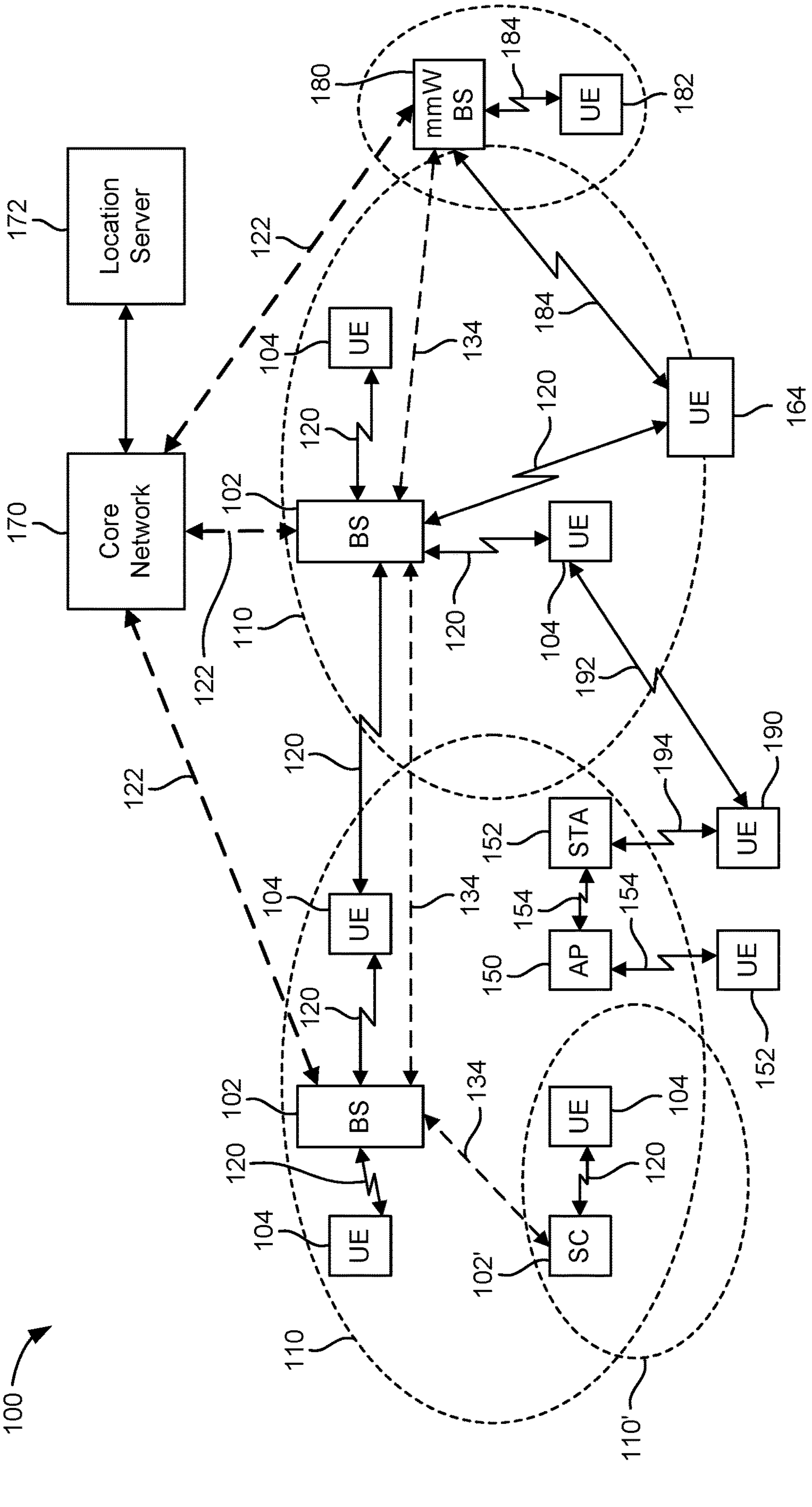
FIG. 1 illustrates an example wireless communications system.

Techniques are provided herein for performing channel stitching for cellular based radio frequency (RF) sensing. In general, RF sensing may be regarded as consumer-level radar with advanced detection capabilities. For example, RF sensing may be used in applications such as health monitoring (e.g., heartbeat detection, respiration rate monitoring, etc.), gesture recognition (e.g., human activity recognition, keystroke detection, sign language recognition), contextual information acquisition (e.g., location detection/tracking, direction finding, range estimation), automotive Radar (e.g., smart cruise control, collision avoidance) and the like. In an example, mmW RF signals such as 3GPP NR FR2/FR2x/FR4 are particularly suited for range detection applications. Due to the increased bandwidth allocations for cellular communications systems (e.g., 5G and beyond), and the development of more use cases for cellular communications, capabilities for joint communication and RF sensing applications may be a requirement for future cellular systems. The systems and methods herein utilize mix numerologies to enable mobile devices to increase the accuracy of RF sensing operations with channel stitching.

In an example, Orthogonal Frequency Division Multiplexing (OFDM) waveforms may be utilized for joint communication and RF sensing use cases (e.g., joint communication and sensing). OFDM may be used to enable in-band multiplexing between communication channels and other cellular reference signals and physical layer (PHY) channels). In general, the resolution of range estimates in RF sensing depends on the signal bandwidth. A communication network may include base stations (e.g., gNBs) capable of transmitting and receiving symbols which occupy a relatively large bandwidth as compared to capabilities of the mobile devices in the network. For example, the bandwidth utilize by the base stations (e.g., the system bandwidth) may be 400 MHz, however the maximum bandwidth supported by a premium UE may be approximately 100 MHz. Other mobile devices may be capable of utilizing even smaller bandwidths. For example, a reduced capability UE (e.g., Redcap UE) may be capable of supporting bandwidths in the range of 5 MHz to 20 MHz. The techniques provided herein utilize channel stitching to enable the mobile devices to utilize a larger portion of the system bandwidth, and thus increase the accuracy of the RF sensing range measurements.

In an example, a mixed numerology signal transmission scheme may be implemented to the channel stitching and reduce potential phase migration issues associated with moving target range estimation. Specifically, legacy channel stitching solutions may utilize frequency hopping across symbols/slots, which may create phase migration issues for high mobility targets. The techniques discussed herein provide technical improvements for joint communication and sensing operations by reducing the time between obtaining RF sensing tones and thus reducing the phase migration between tones. These techniques and configurations are examples, and other techniques and configurations may be used.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" (BS) are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Referring to FIG. 1, an example wireless communications system 100 is shown. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STA 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over communication links 120 and/or the mmW base station 180 over a mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
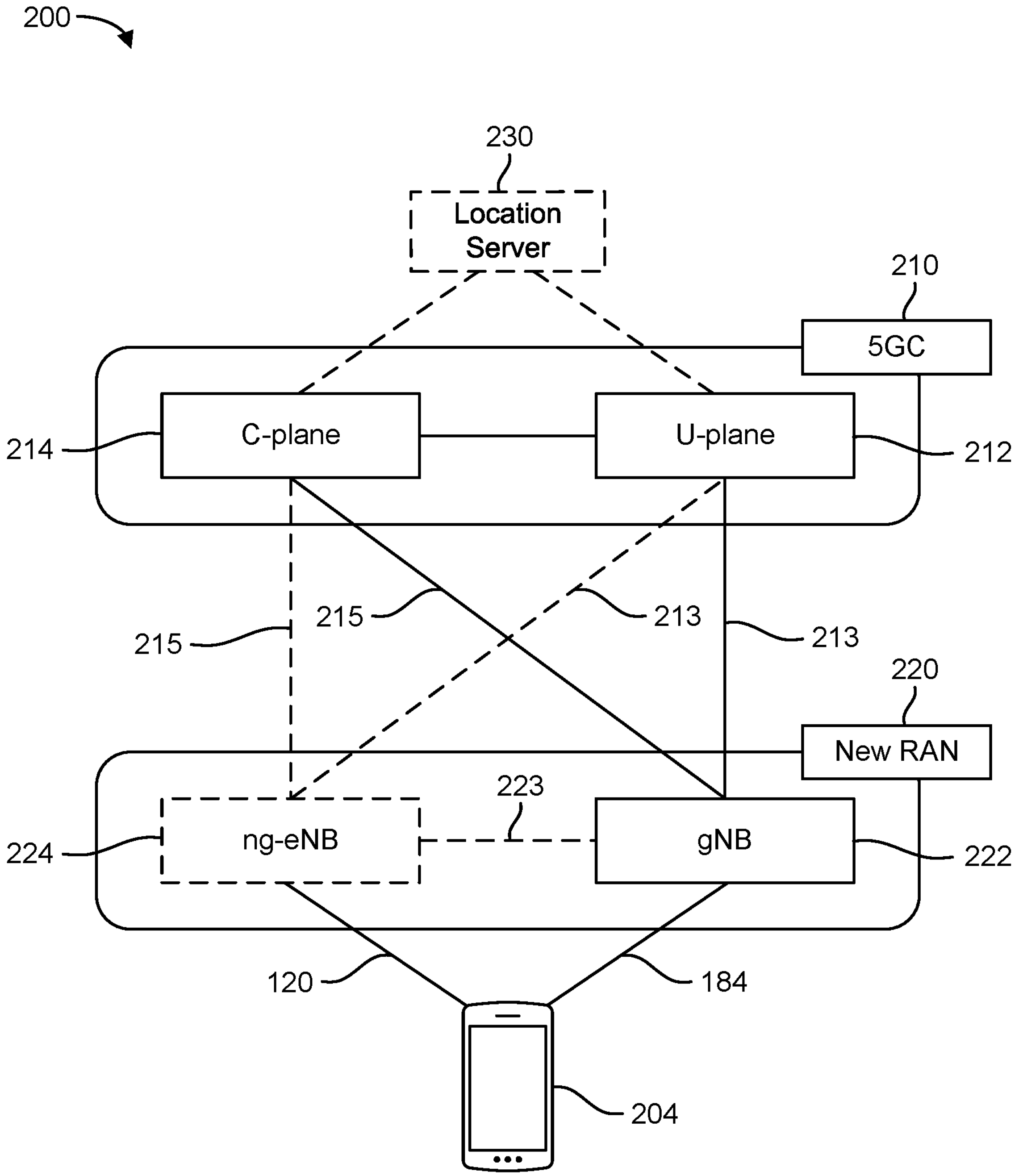
FIGS. 2A and 2B illustrate example wireless network structures.

Referring to FIG. 2A, an example wireless network structure 200 is shown. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
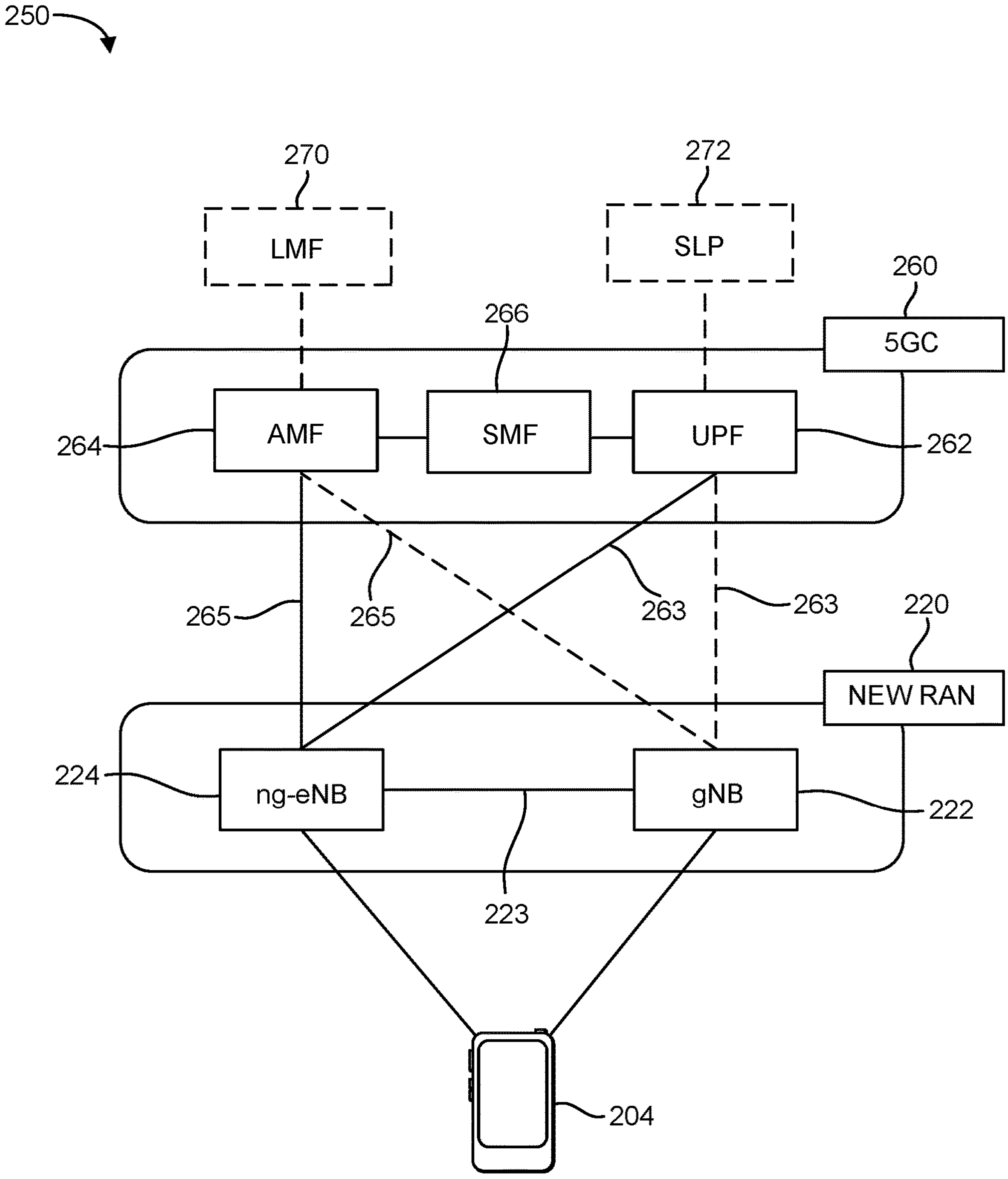

Referring to FIG. 2B, another example wireless network structure 250 is shown. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated into a base station, such as the gNB 222 and/or the ng-eNB 224. When integrated into the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
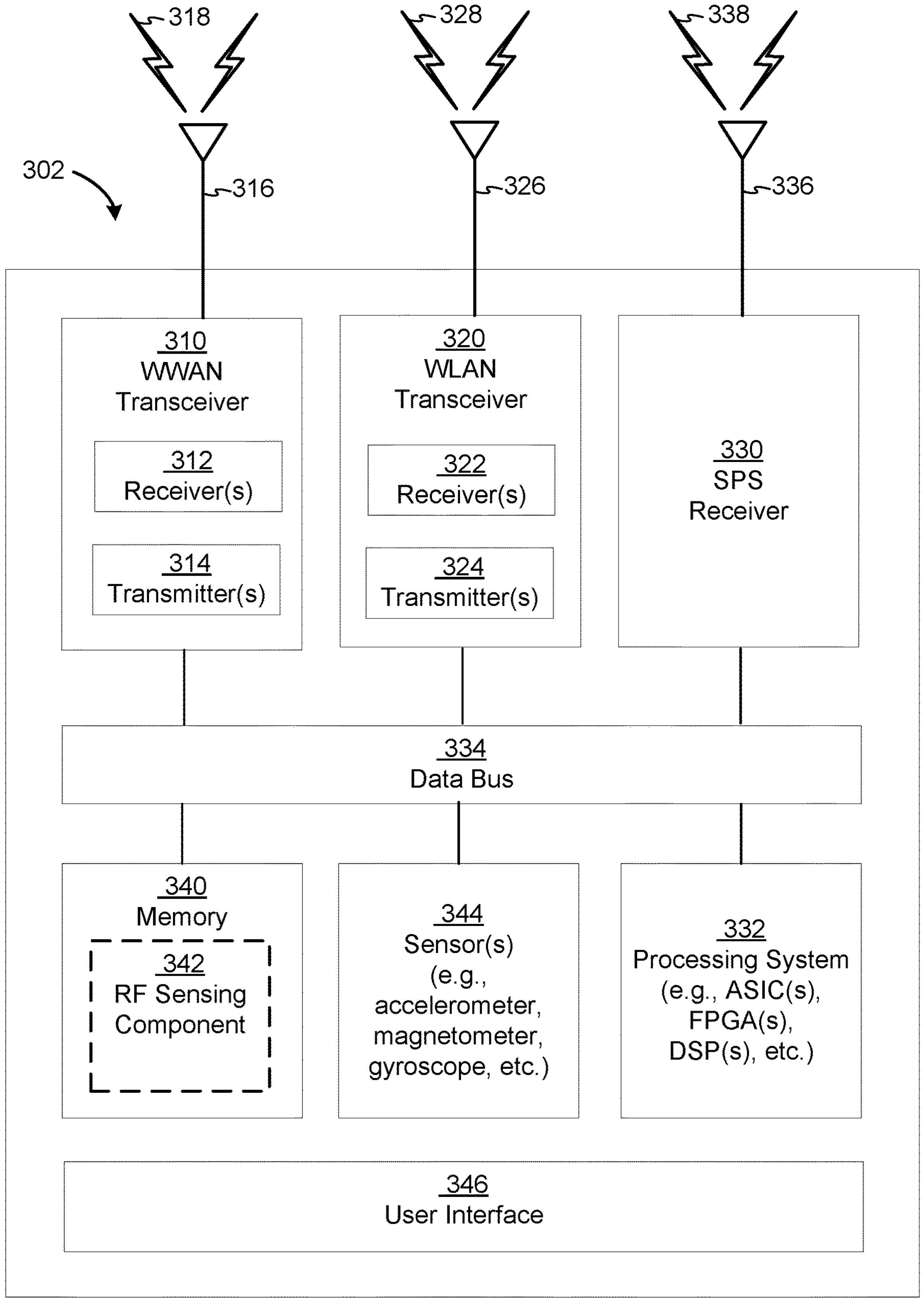
FIGS. 3A to 3C are simplified block diagrams of several sample components that may be employed in wireless communication nodes and configured to support communication.
Figure 3B:
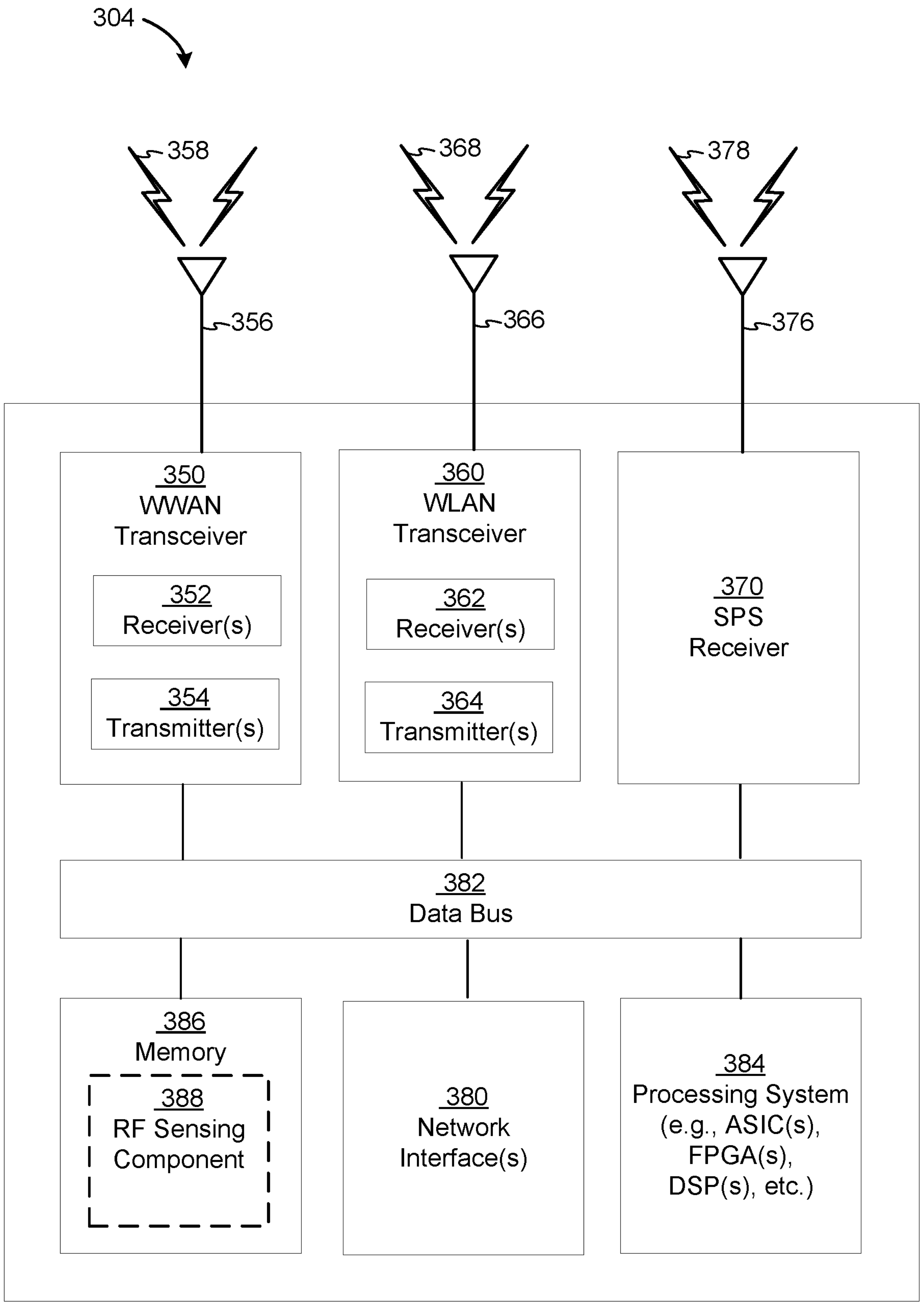
Figure 3C:
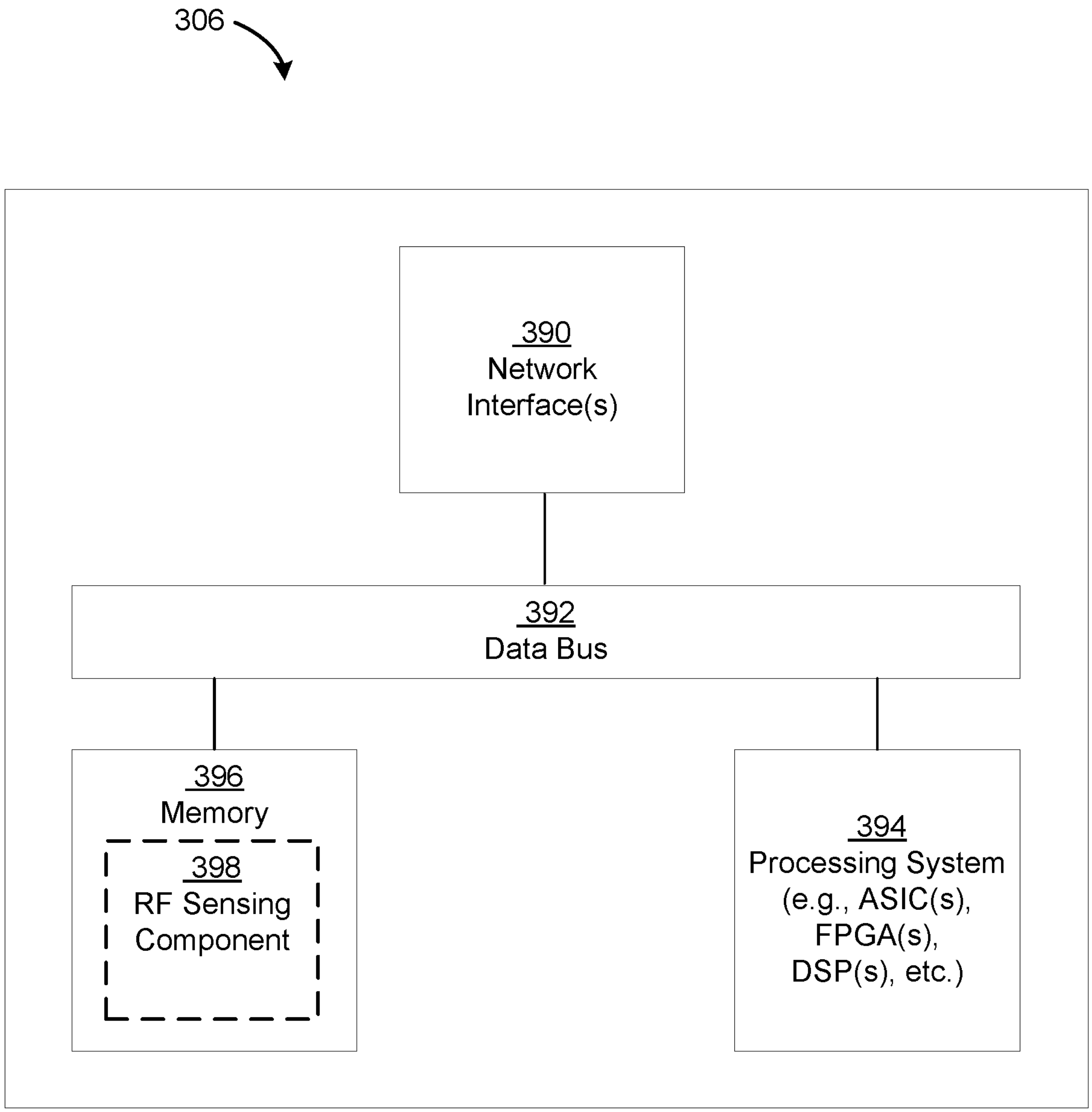

Referring to FIGS. 3A, 3B and 3C, several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations are shown. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, joint communication and RF sensing (i.e., joint communication and sensing (JCS) operations), and for providing other processing functionality. The base station 304 includes a processing system 384 for providing functionality relating to, for example, JCS operations as disclosed herein, and for providing other processing functionality. The network entity 306 includes a processing system 394 for providing functionality relating to, for example, JCS operations as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include RF sensing components 342, 388, and 398, respectively. The RF sensing components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the RF sensing components 342, 388, and 398 may be external to the processing systems 332, 384, and 394 (e.g., part of a modem processing system, integrated with another processing system, etc.). Alternatively, the RF sensing components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by components 310 to 346 may be implemented by processor and memory component(s) of the UE 302 (e.g., by execution of appropriate code and/or by appropriate configuration of processor components). Similarly, some or all of the functionality represented by components 350 to 388 may be implemented by processor and memory component(s) of the base station 304 (e.g., by execution of appropriate code and/or by appropriate configuration of processor components). Also, some or all of the functionality represented by components 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the RF sensing components 342, 388, and 398, etc.

Wireless communication signals (e.g., RF signals configured to carry OFDM symbols) transmitted between a UE and a base station can be reused for environment sensing (also referred to as "RF sensing" or "radar"). Using wireless communication signals for environment sensing can be regarded as consumer-level radar with advanced detection capabilities that enable, among other things, touchless/device-free interaction with a device/system. The wireless communication signals may be cellular communication signals, such as LTE or NR signals, WLAN signals, etc. As a particular example, the wireless communication signals may be an OFDM waveform as utilized in LTE and NR. High-frequency communication signals, such as mmW RF signals, are especially beneficial to use as radar signals because the higher frequency provides, at least, more accurate range (distance) detection.

Figure 4A:
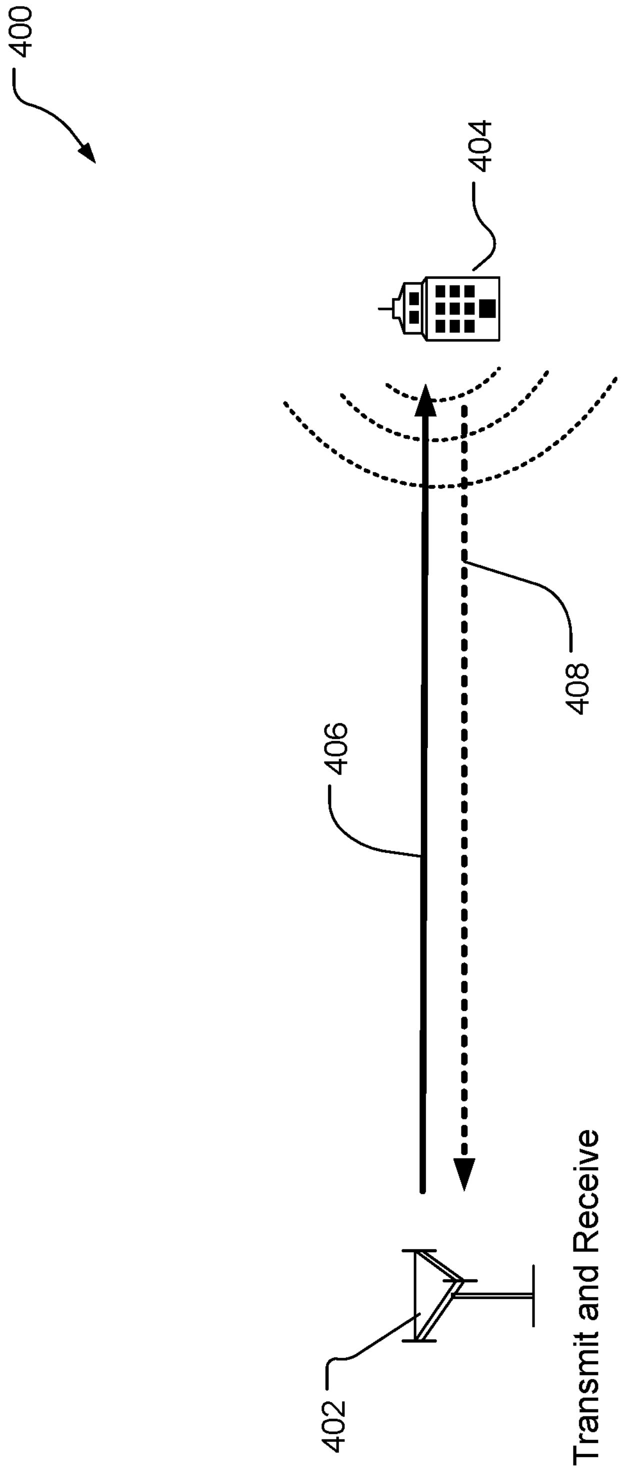
FIG. 4A illustrates an example monostatic radar system.
Figure 4B:
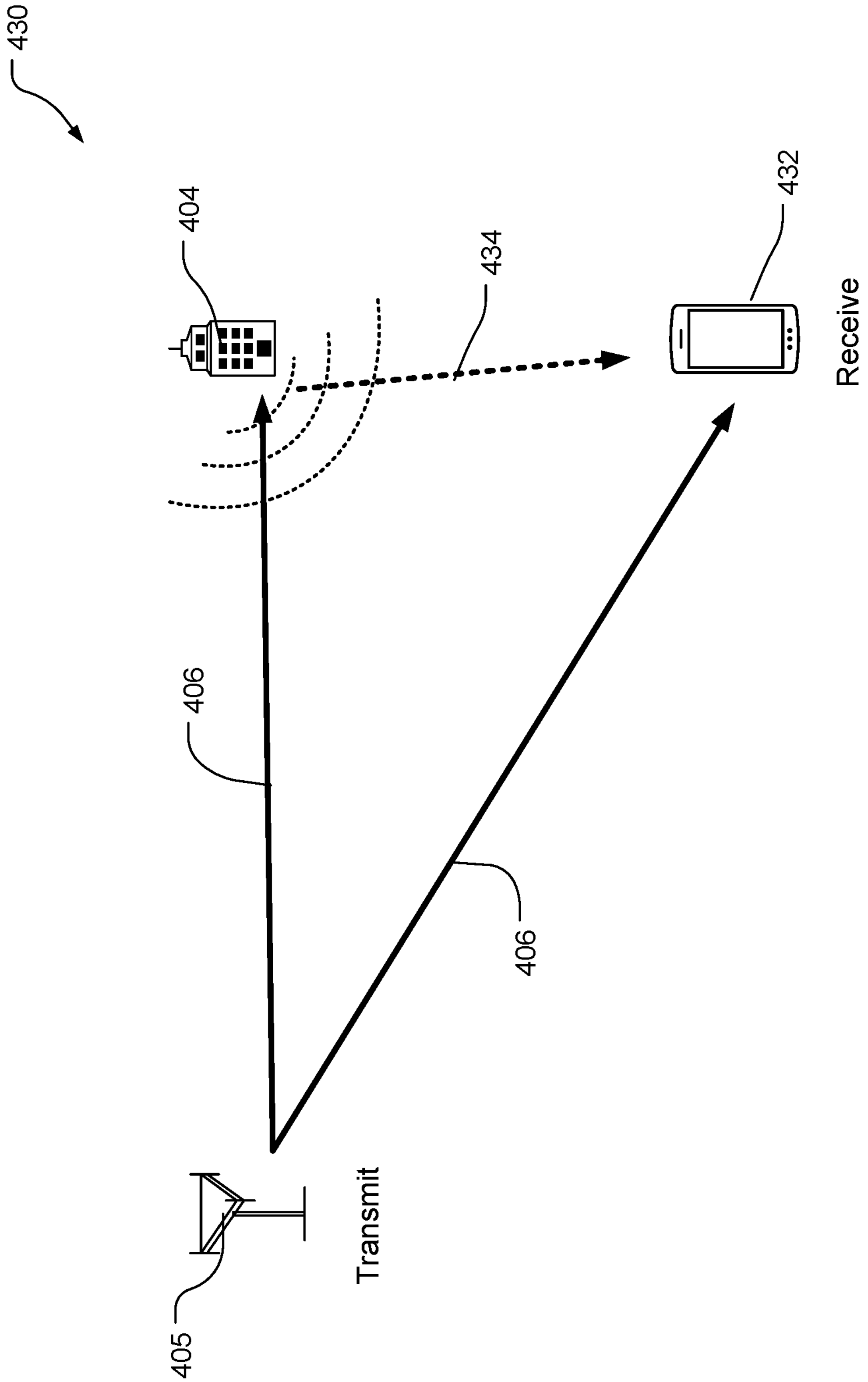
FIG. 4B illustrates an example bistatic radar system.

In general, there are different types of radar, and in particular, monostatic and bistatic radars. FIGS. 4A and 4B illustrate two of these various types of radar. Specifically, FIG. 4A is a diagram 400 illustrating a monostatic radar scenario, and FIG. 4B is a diagram 430 illustrating a bistatic radar scenario. In FIG. 4A, a base station 402 may be configured for full duplex operation and thus the transmitter (Tx) and receiver (Rx) are co-located. For example, a transmitted radio frequency (RF) signal 406 may be reflected off of a target object, such as a building 404, and the receiver on the base station 402 is configured to receive and measure a reflected beam 408. This is a typical use case for traditional, or conventional, radar. In an example, monostatic radio sensing may be realized with half duplex operation such that a transceiver may be configured to transmit a RF sensing signal at a first time, and then receive a reflected signal at a second time. In FIG. 4B, a base station 405 may be configured as a transmitter (Tx) and a UE 432 may be configured as a receiver (Rx). In this example, the transmitter and the receiver are not co-located, that is, they are separated. The base station 405 may be configured to transmit a beam, such as an omnidirectional downlink RF signal which may be received by the UE 432. A portion of the RF signal 406 may be reflected or refracted by the building 404 and the UE 432 may receive this reflected signal 434. This is the typical use case for wireless communication-based (e.g., WiFi-based, LTE-based, NR-based) RF sensing. Note that while FIG. 4B illustrates using a downlink RF signal 406 as a RF sensing signal, uplink RF signals can also be used as RF sensing signals. In a downlink scenario, as shown, the transmitter is the base station 405 and the receiver is the UE 432, whereas in an uplink scenario, the transmitter is a UE and the receiver is a base station.

Referring to FIG. 4B in greater detail, the base station 405 transmits RF sensing signals (e.g., PRS) to the UE 432, but some of the RF sensing signals reflect off a target object such as the building 404. The UE 432 can measure the ToAs of the RF signal 406 received directly from the base station, and the ToAs of the reflected signal 434 which is reflected from the target object (e.g., the building 404).

The base station 405 may be configured to transmit the single RF signal 406 or multiple RF signals to a receiver (e.g., the UE 432). However, the UE 432 may receive multiple RF signals corresponding to each transmitted RF signal due to the propagation characteristics of RF signals through multipath channels. Each path may be associated with a cluster of one or more channel taps. Generally, the time at which the receiver detects the first cluster of channel taps is considered the ToA of the RF signal on the line-of-site (LOS) path (i.e., the shortest path between the transmitter and the receiver). Later clusters of channel taps are considered to have reflected off objects between the transmitter and the receiver and therefore to have followed non-LOS (NLOS) paths between the transmitter and the receiver.

Thus, referring back to FIG. 4B, the RF signal 406 follows a LOS path between the base station 405 and the UE 432, and the reflected signal 434 represents the RF sensing signals that followed a NLOS path between the base station 405 and the UE 432 due to reflecting off the building 404 (or another target object). The base station 405 may have transmitted multiple RF sensing signals (not shown in FIG. 4B), some of which followed the LOS path and others of which followed the NLOS path.

Alternatively, the base station 405 may have transmitted a single RF sensing signal in a broad enough beam that a portion of the RF sensing signal followed the LOS path and a portion of the RF sensing signal followed the NLOS path.

Based on the difference between the ToA of the LOS path, the ToA of the NLOS path, and the speed of light, the UE 432 can determine the distance to the building 404. In addition, if the UE 432 is capable of receive-beam forming, the UE 432 may be able to determine the general direction to the building 404 as the direction of the reflected signal 434, which is the RF sensing signal following the NLOS path as received. The UE 432 may then optionally report this information to the transmitting base station 405, an application server associated with the core network, an external client, a third-party application, or some other entity. Alternatively, the UE 432 may report the ToA measurements to the base station 405, or other entity, and the base station 405 may determine the distance and, optionally, the direction to the target object.

Note that if the RF sensing signals are uplink RF signals transmitted by the UE 432 to the base station 405, the base station 405 would perform object detection based on the uplink RF signals just like the UE 432 does based on the downlink RF signals.

Figure 5:
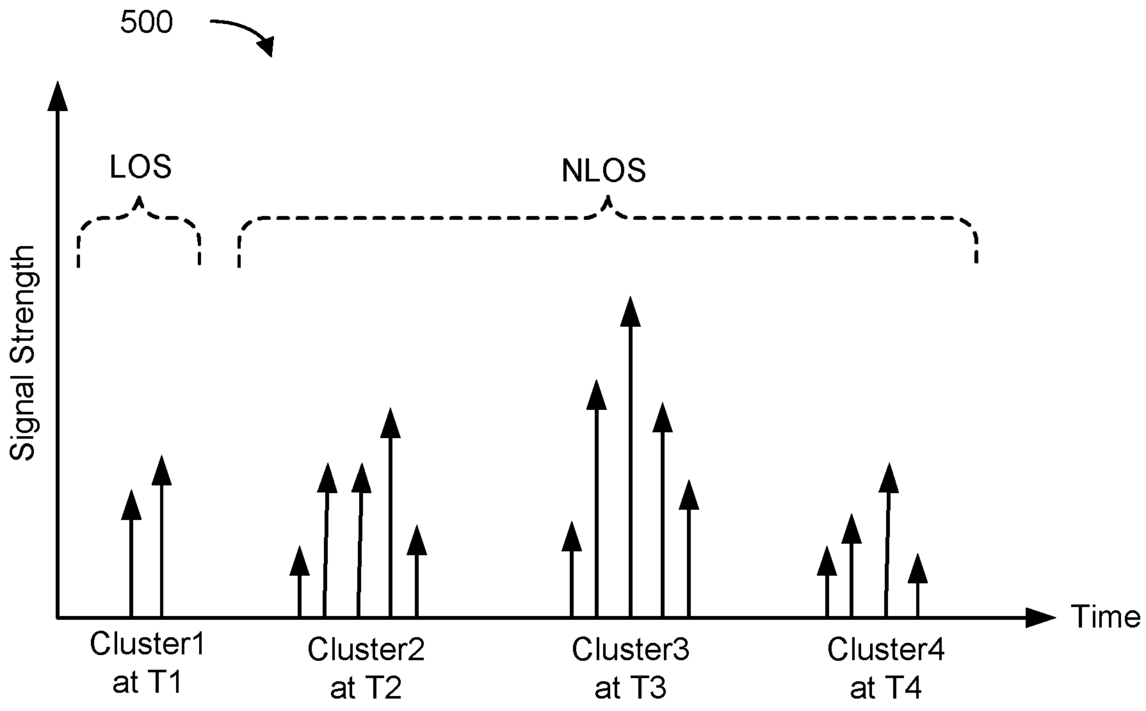
FIG. 5 is an example graph showing a radio frequency (RF) channel response over time.

Referring to FIG. 5, an example graph 500 showing an RF channel response at a receiver (e.g., any of the UEs or base stations described herein) over time is shown. In the example of FIG. 5, the receiver receives multiple (four) clusters of channel taps. Each channel tap represents a multipath that an RF signal followed between the transmitter (e.g., any of the UEs or base stations described herein) and the receiver. That is, a channel tap represents the arrival of an RF signal on a multipath. Each cluster of channel taps indicates that the corresponding multipaths followed essentially the same path. There may be different clusters due to the RF signal being transmitted on different transmit beams (and therefore at different angles), or because of the propagation characteristics of RF signals (potentially following widely different paths due to reflections), or both.

Under the channel illustrated in FIG. 5, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 5, because the first cluster of RF signals at time T1 arrives first, it is presumed to be the LOS data stream (i.e., the data stream arriving over the LOS or the shortest path), and may correspond to the LOS path illustrated in FIG. 4B (e.g., the RF signal 406). The third cluster at time T3 is comprised of the strongest RF signals, and may correspond to the NLOS path illustrated in FIG. 4B (e.g., the reflected signal 434). Note that although FIG. 5 illustrates clusters of two to five channel taps, as will be appreciated, the clusters may have more or fewer than the illustrated number of channel taps.

Figure 6A:
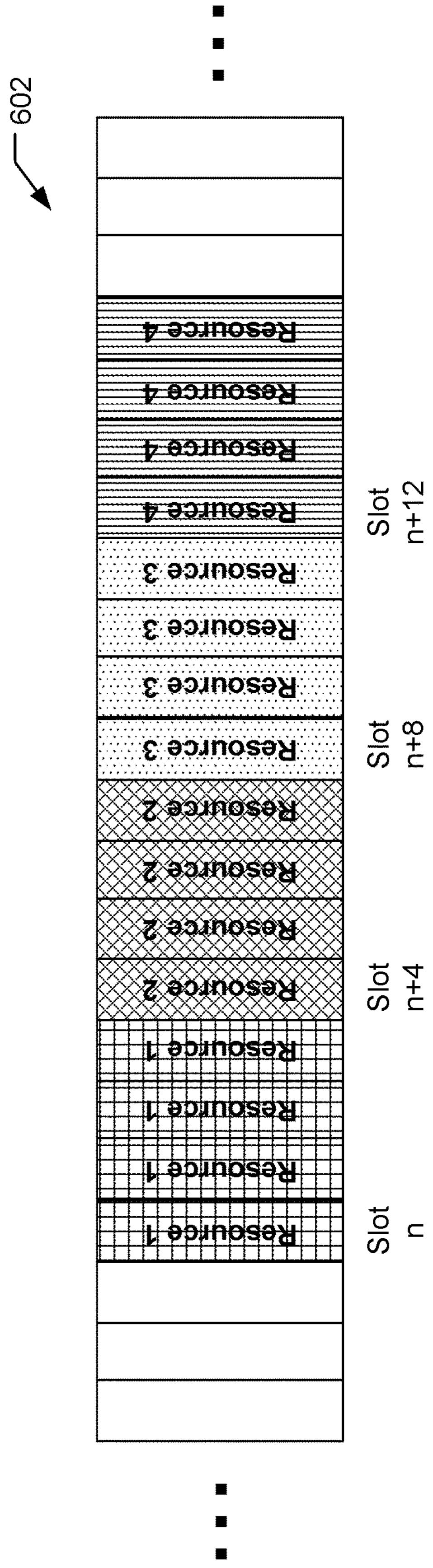
FIGS. 6A and 6B illustrate example reference signal resources.
Figure 6B:
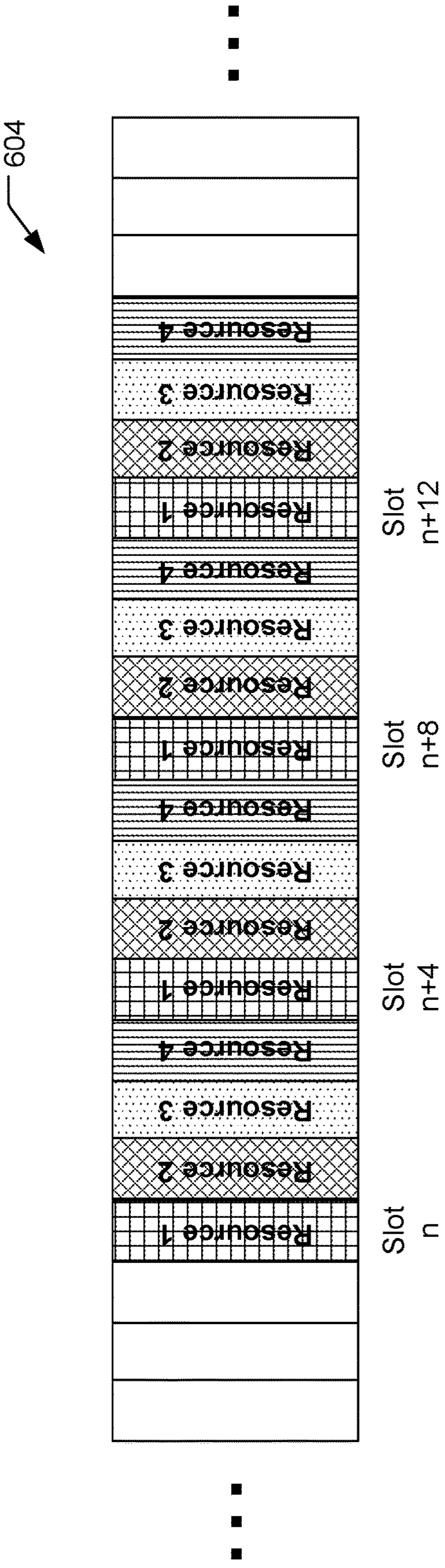

Referring to FIGS. 6A and 6B, example downlink Reference Signal (RS) resource sets are shown. In an example, the RF sensing beams described herein may be based on SS Blocks, CSI-RS, TRS, or PRS resource sets. Other sensing and tracking reference signals may also be used. In general, a RS resource set is a collection of RS resources across one base station (e.g., a base station 304) which have the same periodicity, a common muting pattern configuration and the same repetition factor across slots. A first RS resource set 602 includes 4 resources and a repetition factor of 4, with a time-gap equal to 1 slot. A second RS resource set 604 includes 4 resources and a repetition factor of 4 with a time-gap equal to 4 slots. The repetition factor indicates the number of times each RS resource is repeated in each single instance of the RS resource set (e.g., values of 1, 2, 4, 6, 8, 16, 32). The time-gap represents the offset in units of slots between two repeated instances of a RS resource corresponding to the same RS resource ID within a single instance of the RS resource set (e.g., values of 1, 2, 4, 8, 16, 32). The time duration spanned by one RS resource set containing repeated RS resources does not exceed RS-periodicity. The repetition of a RS resource enables receiver beam sweeping across repetitions and combining RF gains to increase coverage. The repetition may also enable intra-instance muting.

In general, the RS resources depicted in FIGS. 6A and 6B may be a collection of resource elements (REs) that are used for transmission of the RS. The collection of resource elements can span multiple physical resource blocks (PRBs) in the frequency domain and N (e.g., 1 or more) consecutive symbol(s) within a slot in the time domain. In a given OFDM symbol, a RS resource occupies consecutive PRBs. A RS resource may be described by at least the following parameters: RS resource identifier (ID), sequence ID, comb size-N, resource element offset in the frequency domain, starting slot and starting symbol, number of symbols per RS resource (i.e., the duration of the RS resource), and QCL information (e.g., QCL with other DL reference signals). The comb size indicates the number of subcarriers in each symbol carrying RS. For example, a comb-size of comb-4 means that every fourth subcarrier of a given symbol carries RS.

In an example, a RS resource set is a set of RS resources used for the transmission of RS signals, where each RS resource has a RS resource ID. In addition, the RS resources in a RS resource set may be associated with the same transmission-reception point (e.g., a base station). Each of the RS resources in the RS resource set may have the same periodicity, a common muting pattern, and the same repetition factor across slots. A RS resource set is identified by a RS resource set ID and may be associated with a particular TRP (identified by a cell ID) transmitted by an antenna panel of a base station. A RS resource ID in a RS resource set may be associated with an omnidirectional signal, and/or with a single beam (and/or beam ID) transmitted from a single base station (where a base station may transmit one or more beams). Each RS resource of a RS resource set may be transmitted on a different beam and as such, a RS resource, or simply resource can also be referred to as a beam. Note that this does not have any implications on whether the base stations and the beams on which RS are transmitted are known to the UE.

Figure 7:
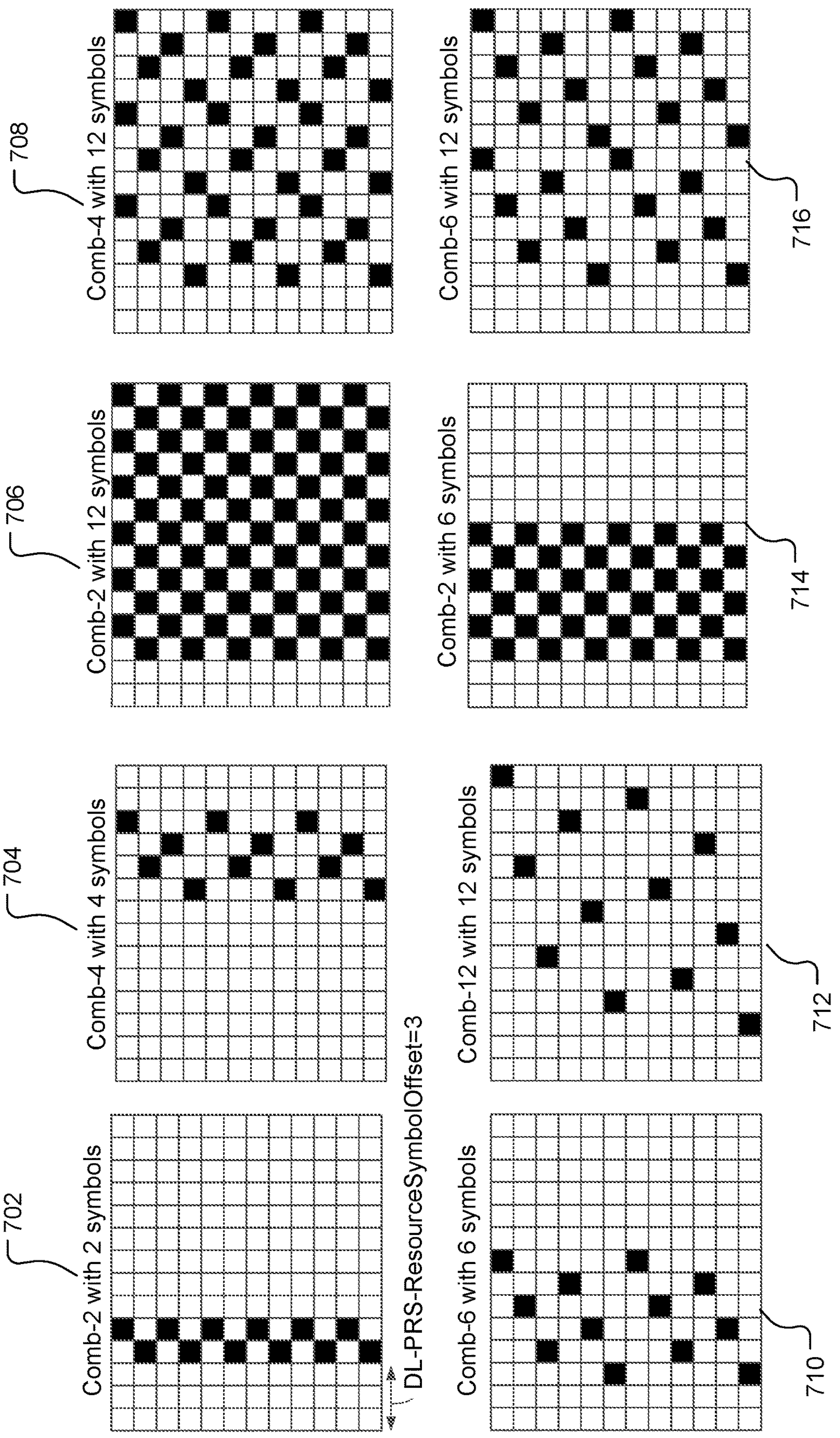
FIG. 7 is an illustration of example subframe formats for positioning reference signal transmission.

In an example, the RF sensing reference signals describe herein may utilize PRS waveforms. Referring to FIG. 7, example subframe and slot formats for positioning reference signal transmissions are shown. The example subframe and slot formats may be included in the RS resource sets depicted in FIGS. 6A and 6B. The subframes and slot formats in FIG. 7 are examples and not limitations and include a comb-2 with 2 symbols format 702, a comb-4 with 4 symbols format 704, a comb-2 with 12 symbols format 706, a comb-4 with 12 symbols format 708, a comb-6 with 6 symbols format 710, a comb-12 with 12 symbols format 712, a comb-2 with 6 symbols format 714, and a comb-6 with 12 symbols format 716. In general, a subframe may include 14 symbol periods with indices 0 to 13. Typically, a base station may transmit the PRS from antenna port 5000 on one or more slots in each subframe configured for PRS transmission.

A base station may transmit the PRS over a particular PRS bandwidth, which may be configured by higher layers. A PRS Resource may be located anywhere in the frequency grid. A common reference point for the PRS may be defined as "PRS Point A". The "PRS Point A" may serve as a common reference point for the PRS resource block grid and may be represented by an Absolute Radio Frequency Channel Number (ARFCN). The PRS Start Physical Resource Block (PRB) may then be defined as a frequency offset between PRS Point A and the lowest subcarrier of the lowest PRS resource block expressed in units of resource blocks. The base station may transmit the PRS on subcarriers spaced apart across the PRS bandwidth.

The base station may also transmit the PRS based on the parameters such as PRS periodicity, PRS Resource Set Slot Offset, PRS Resource Slot Offset, PRS Resource Repetition Factor and PRS Resource Time Gap. PRS periodicity is the periodicity at which the PRS Resource is transmitted in number of slots. The PRS periodicity may depend on the subcarrier spacing (SCS) and may be, for example, $2^{\mu}$ {4, 5, 8, 10, 16, 20, 32, 40, 64, 80, 160, 320, 640, 1280, 2560, 5120, 10240} slots, with $\mu$=0, 1, 2, 3 for SCS 15, 30, 60, and 120 kHz, respectively. PRS Resource Set Slot Offset defines the slot offset with respect to System Frame Number (SFN)/Slot Number zero of the TRP (i.e., defines the slot where the first PRS Resource of the PRS Resource Set occurs). PRS Resource Slot Offset defines the starting slot of the PRS Resource with respect to the corresponding PRS Resource Set Slot Offset. PRS Resource Repetition Factor defines how many times each PRS Resource is repeated for a single instance of the PRS Resource Set, and PRS Resource Time Gap defines the offset in number of slots between two repeated instances of a PRS Resource within a single instance of the PRS Resource Set, as described above.

Figure 8:
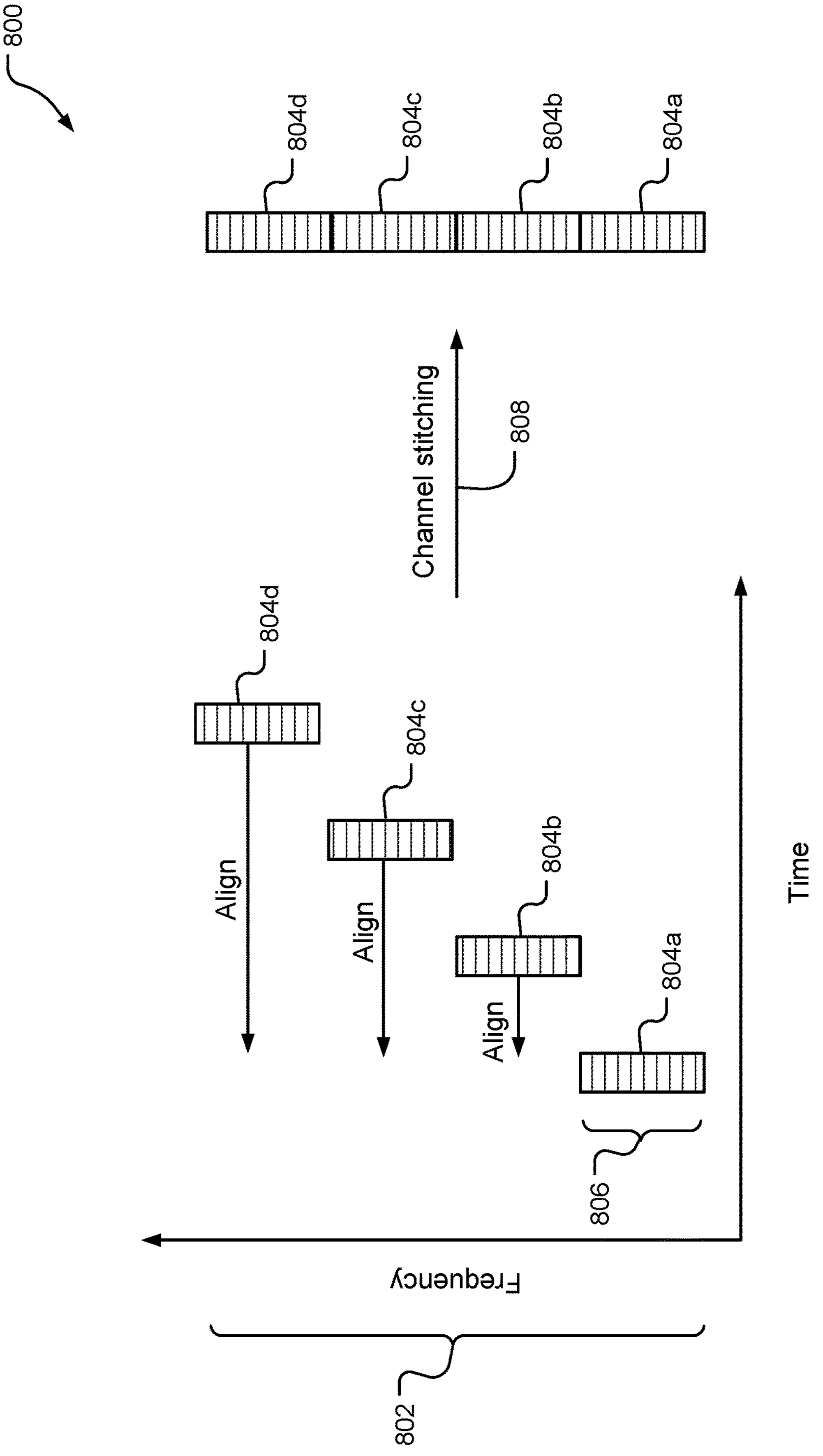
FIG. 8 is a diagram of an example coherent channel stitching procedure for positioning signal measurements.

Referring to FIG. 8, a diagram of an example coherent channel stitching procedure 800 for positioning signal measurements is shown. In general, the procedure 800 is performed by a UE to combine multiple narrow band signals at different times and/or different channels to obtain a consistent wideband signal. For example, a base station, such as a gNB, may be capable of transmitting OFDM signals across a relatively wideband width 802 (e.g., 400 MHz+) as compared to a limited bandwidth 806 that a UE may utilize (e.g. 5-20 MHz). In a positioning application, the UE may be configured to obtain segments of different reference signals transmitted by the gNB to obtain a wideband signal. The UE may perform a single Fast Fourier Transform (or other signal processing) on the stitched wideband signal. For example, the UE may receive and buffer the tones for respective portions of a first symbol 804*a*, a second symbol 804*b*, a third symbol 804*c*, and a fourth symbol 804*d*. The symbols 804*a-d* are transmitted at different times, and the UE is configured to retune to different frequencies/channels to receive and buffer the respective symbols 804*a-d*. A channel stitching operation 808 is configured to align the respective symbols 804*a-d* and then perform the FFT on the combined symbols 804*a-d*. In a positioning application, the time alignment and increased bandwidth may be used to increase the accuracy of a range measurement.

The accuracy improvements enabled by channel stitching across symbols or slots may be reduced due to phase migration for high mobility applications. For example, when the UE is moving or when a target object is moving during RF sensing operations. The techniques provided herein utilize a mixed numerology signal transmission schemes to overcome the phase migration problem for moving target range estimation.

Figure 9:
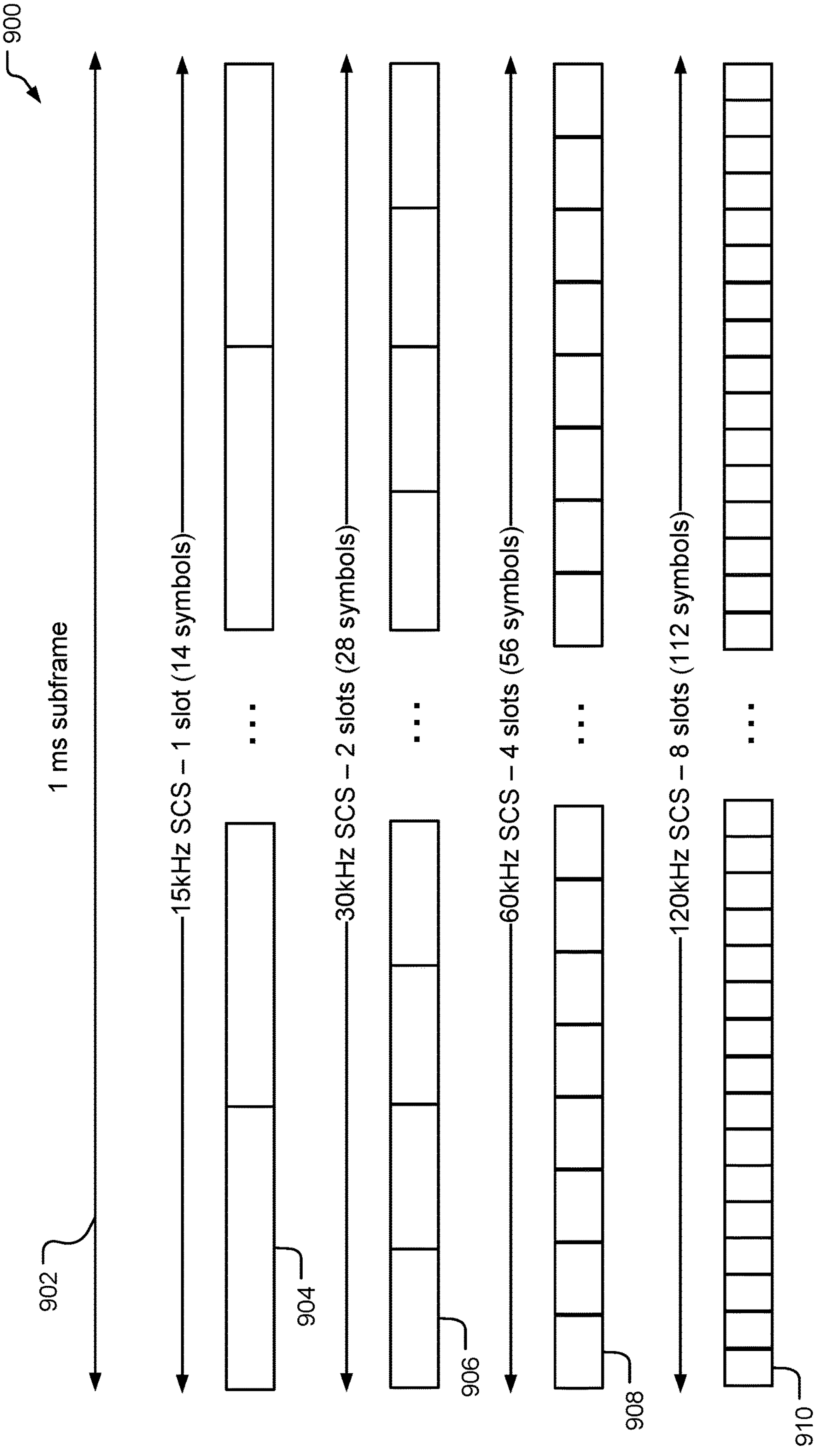
FIG. 9 is a diagram of example frequency domain numerologies including different subcarrier spacing (SCS) and the associated slots and symbols.

Referring to FIG. 9, a diagram 900 of example frequency domain numerologies including different subcarrier spacing (SCS) and associated slots and symbols are shown. A 5G radio frame has a fixed duration of 10 ms, and a subframe 902 has a fixed duration of 1 ms (e.g., each frame has 10 subframes 902). The slot duration and symbol duration depend upon the numerology, and thus the number of slots per subframe and the number of symbols per subframe also depend upon the numerology. The number of symbols per slot is always 14 when using a normal cyclic prefix and 12 when using an extended cyclic prefix. The diagram 900 illustrates the symbols belonging to a 1 ms subframe for different numerologies. For example, in a 15 kHz SCS, on subframe 902 includes 1 slot with a total of 14 symbols such as a first symbol 904. A 30 kHz SCS includes 2 slots per subframe, with a total of 28 symbols such as a second symbol 906. A 60 kHz SCS includes 4 slots per subframe, with a total of 56 symbols such as a third symbol 908. A 120 kHz SCS includes 8 slots per subframe, with a total of 112 symbols such as a fourth symbol 910. The slot durations for the respective numerologies are provided in Table 1 below:

TABLE 1

| Sub-carrier spacing (kHz) | Symbols/ slot | slots/ sub-frame | slots/ frame | slot (ms) | Symbol duration (μs) | Max. nominal system BW (MHz) with 4K FFT size |
|---|---|---|---|---|---|---|
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 240 | 14 | 16 | 160 | 0.0625 | 4.17 | 800 |

When a numerology of 15 kHz is used, in the time domain a frame (e.g., 10 ms) is divided into 10 equally sized subframes of 1 ms each, and each subframe includes one time slot. In FIG. 9, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. The number of bits carried by each RE depends on the modulation scheme.

In an example, a RF sensing signal may be based on PRS waveforms such as the subframe and slot formats described in FIG. 7. Other subframe and slot formats may also be used. For example, a JCS signal may include RF sensing signal components such as the comb-2 with 4 symbol format. Other RF sensing waveforms may also be used.

Figure 10:
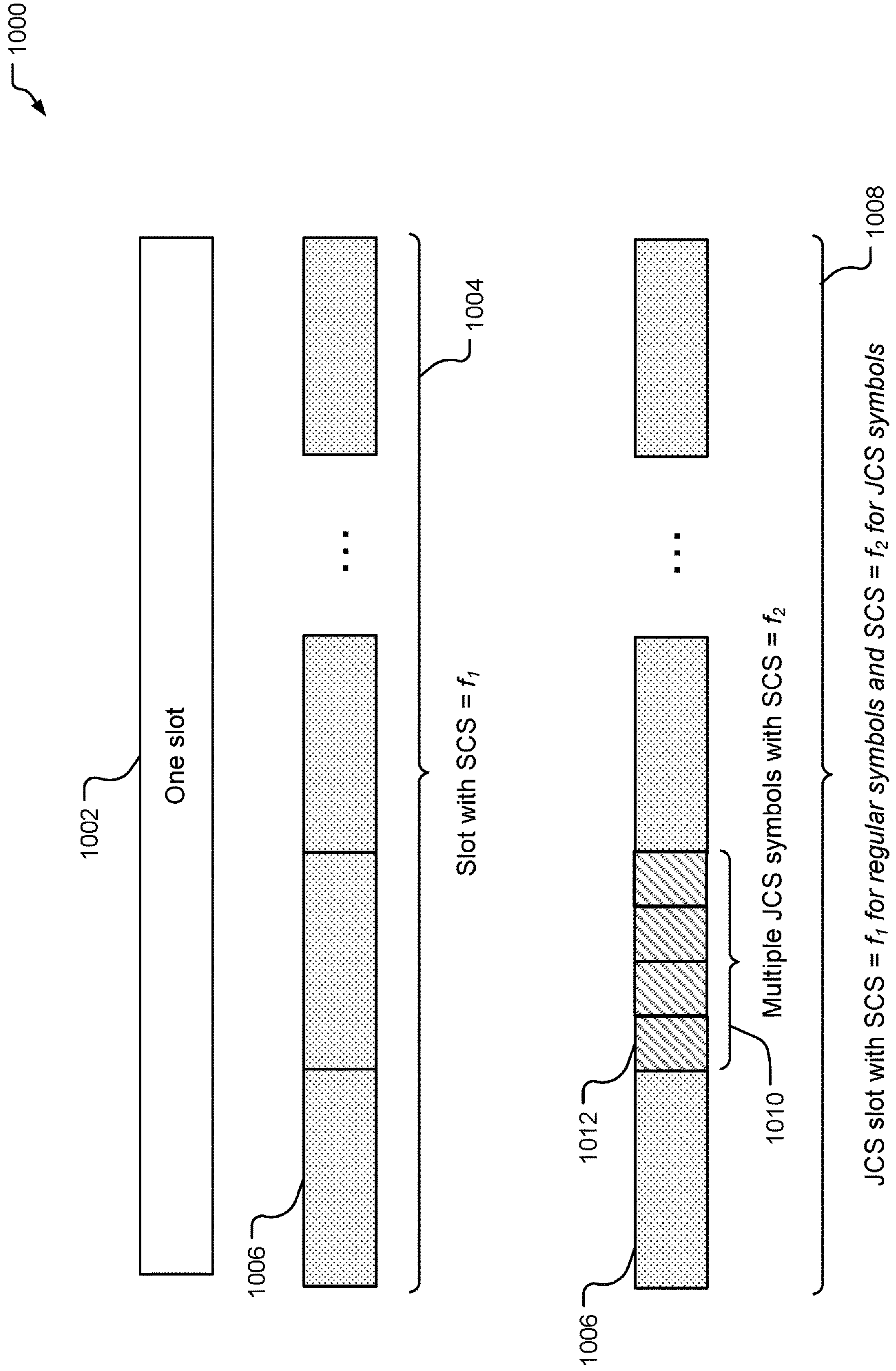
FIG. 10 is a first example mixed numerology for joint communication and sensing.

Referring to FIG. 10, a first example mixed numerology for joint communication and sensing is shown. A numerology diagram 1000 depicts example slots 1002 with various symbol durations associated with different subcarrier spacing values. A first numerology 1004 may be based on a first SCS frequency ($f_1$) and may comprise symbols having a first duration in time 1006. For example, the first numerology 1004 may utilize a SCS of 30 kHz with a symbol duration of 33.3 μs. For JCS operations, a mixed numerology slot 1008 may be configured with symbols of different durations. A JCS slot may include one or more symbols based the on the first SCS ($f_1$), including symbols having the first duration in time 1006, and a second numerology 1010 with one or more symbols based on a second SCS ($f_2$) comprising symbols having a second duration in time 1012, which is less than the first duration in time 1006. For example, the second numerology 1010 may utilize a SCS of 120 kHz with a symbol duration of 8.33 μs. In operation, the first SCS ($f_1$) may be used for communication symbols and the second SCS ($f_2$) may be used for RF sensing symbols. The number of different numerologies and symbol durations in the diagram 1000 are examples, and not limitations, as other numerologies and symbol durations may also be used for JCS operations.

In an example, RF sensing operations may utilize wideband radar signals with a sweeping frequency, such as Frequency-Modulation Continuous-Wave (FMCW) radar, to realize wide bandwidth accuracy with a small baseband bandwidth. Such frequency sweeping operations, however, may be problematic with OFDM waveforms because one subcarrier in an OFDM signal is fully dedicated even if that frequency is occupied for only a short period of time within the OFDM symbol. Thus, for a narrow SCS the OFDM symbol duration is long, and a radar signal (with frequency sweep) may occupy a wide range of frequencies for the duration of one full OFDM symbol. The partial utilization of the symbol duration during frequency sweeping is wasteful from a system resource perspective. The mixed numerology slot 1008 may be used to reduce wasted symbol duration by utilizing the second numerology 1010 for RF sensing. The larger SCS and the relatively shorter symbol duration in time 1012 may reduce a RF sensing signal's time-frequency domain footprint while still enabling wideband frequency sweeping. Additional radar signal hops across different symbols in different frequencies may be used to realize similar effects as sweeping (e.g., FMCW). A UE with a limited bandwidth may be configured to utilize channel stitching such as described in FIG. 8 to capture the tones across a larger system BW signal within a single OFDM symbol. The mixed numerology enables time-division multiplexing (TDM) of the "TDM" based wideband signal capture with limited UE baseband capability.

Figure 11A:
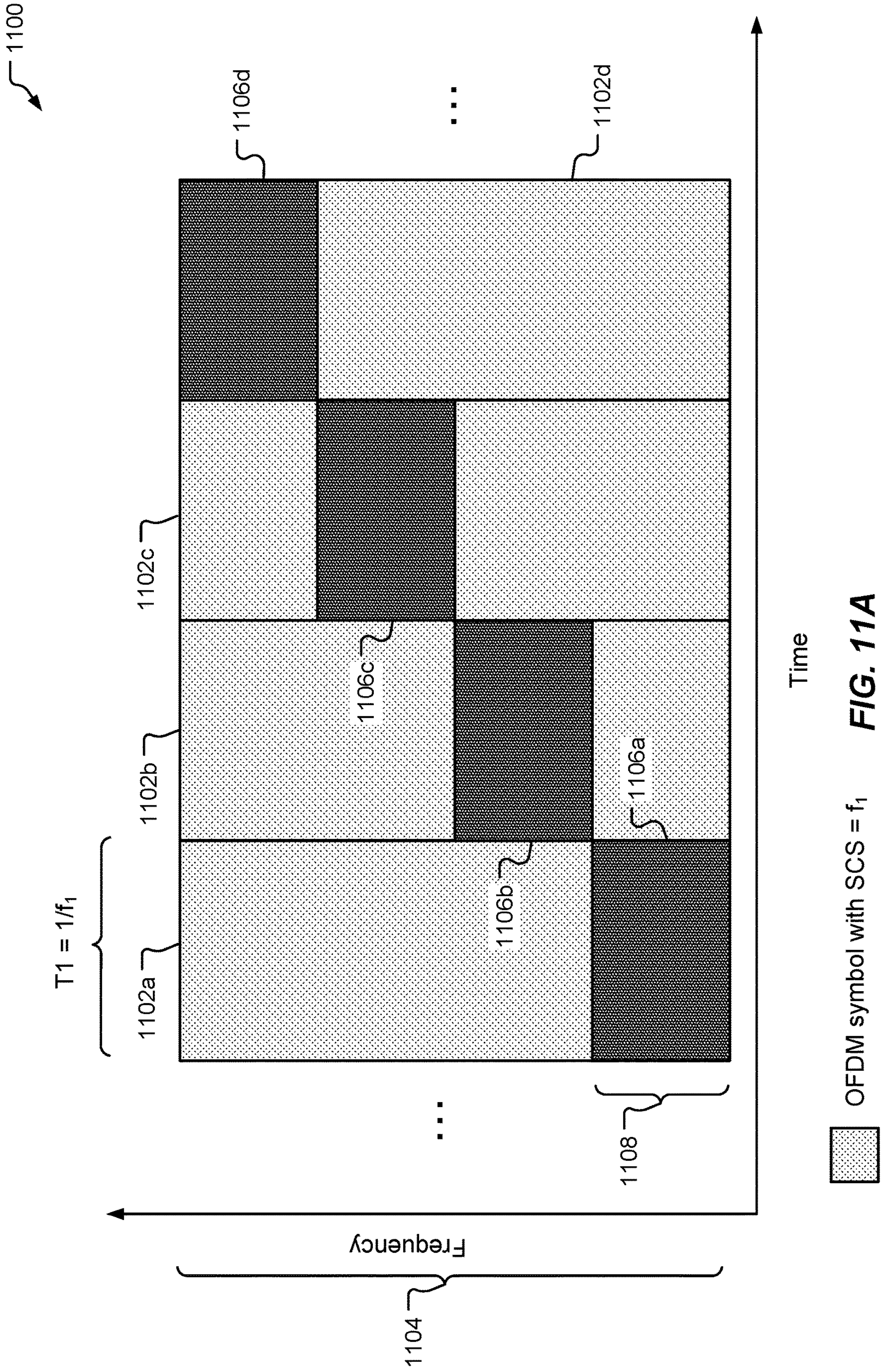
FIG. 11A illustrates example OFDM symbols for radio frequency sensing operations with a single subcarrier spacing.

Referring to FIG. 11A, a diagram 1100 of example OFDM symbols for RF sensing operations with a single SCS is shown. The diagram 1100 includes a plurality of symbols 1102*a-d* configured for RF sensing operations plotted in the time and frequency domains. The duration of each of the symbols 1102*a-d* is based on the SCS as indicated in Table 1. For example, for an SCS of 30 kHz, the symbol duration (T1) is 33.3 μs. The plurality of symbols 1102*a-d* may be transmitted by a network station, such as a gNB, and may utilize a system bandwidth 1104. A receiving device, such as a UE, may have a limited bandwidth 1108 and may be configured to perform a channel stitching operation such as described in FIG. 8. For example, the receiving device may receive a first portion 1106*a* of a first symbol 1102*a*, a second portion 1106*b* of a second symbol 1102*b*, a third portion 1106*c* of a third symbol 1102*c*, and a fourth portion 1106*d* of a fourth symbol 1102*d*. The receiving device may stitch the portions 1106*a-d* and perform an FFT on the combined portions 1106*a-d*. In an example, the RF sensing waveform may only utilize of portion of each of the plurality of symbols 1102*a-d*, but the UE must receive each of the four symbols 1102*a-d* to obtain the full bandwidth signal. The delay (e.g., four symbol durations) to obtain the full bandwidth signal may degrade the accuracy of RF sensing operations for quickly moving targets, and/or when the UE is in motion. The mixed numerologies for JCS operations described in FIG. 10 may be used to overcome this limitation.

Figure 11B:
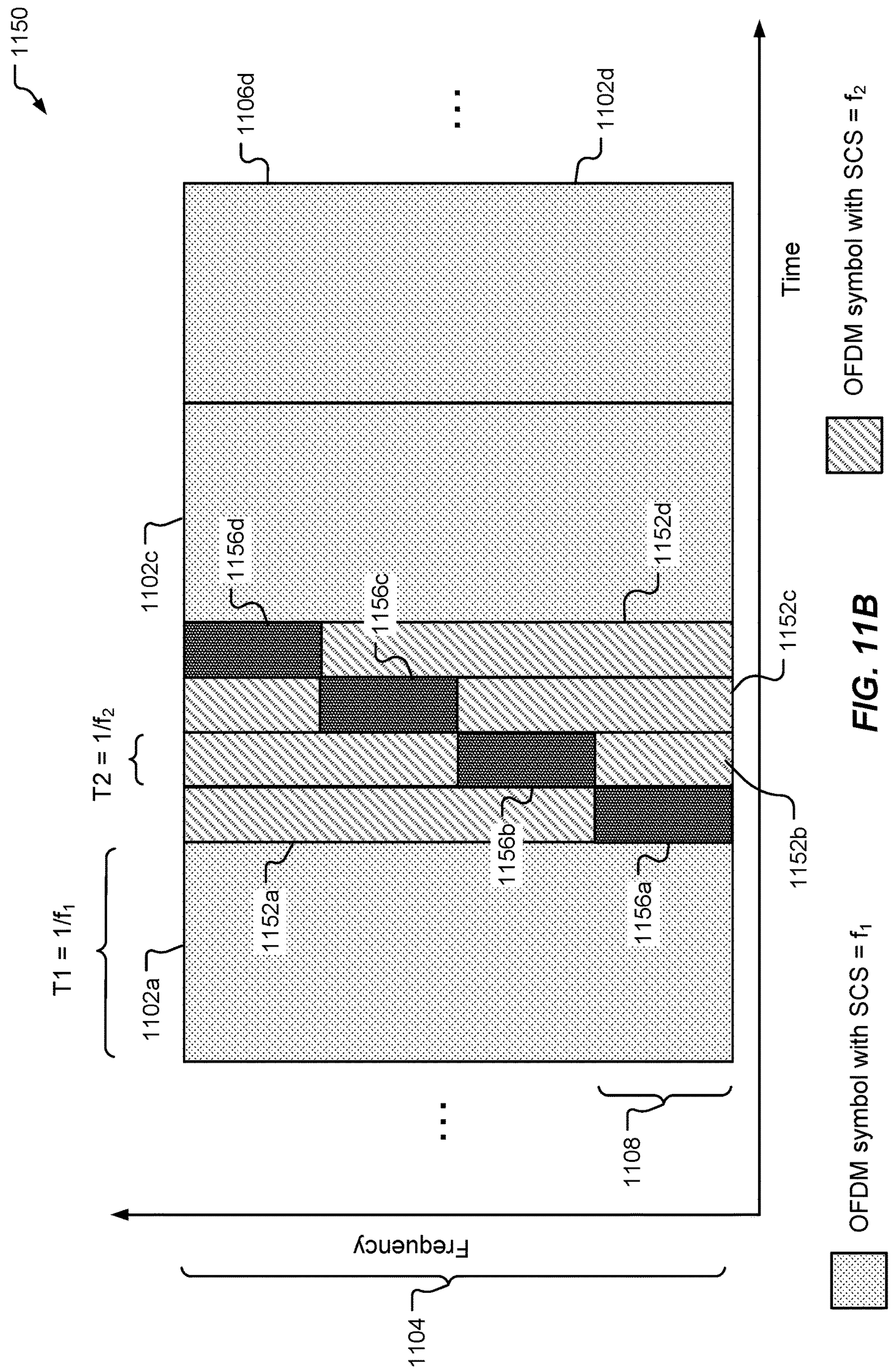
FIG. 11B illustrates example OFDM symbols for joint communication and sensing operations with a plurality of subcarrier spacing values.
Figure 11C:
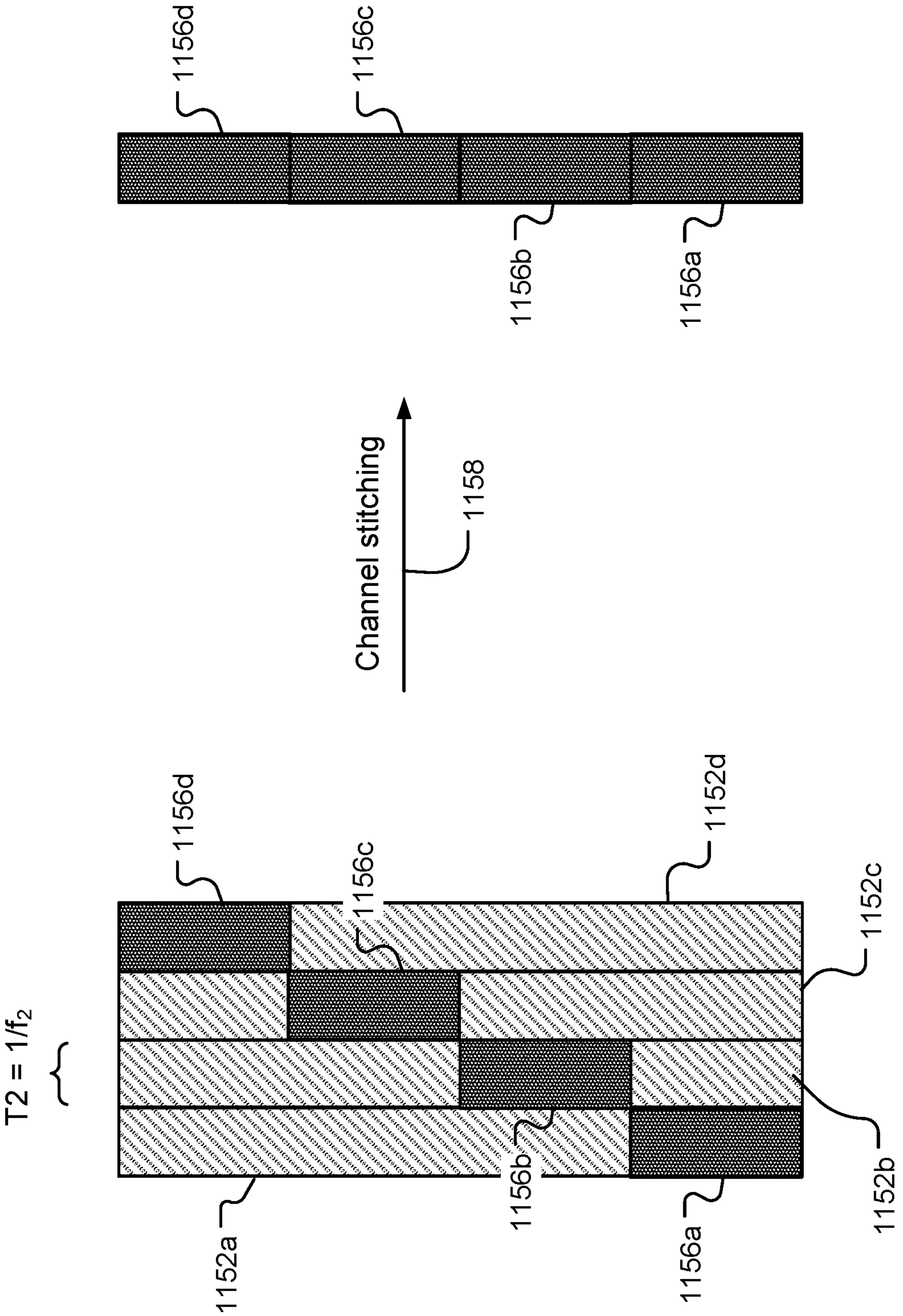
FIG. 11C is a diagram of example channel stitching based on the joint communication and sensing of FIG. 11B.

Referring to FIG. 11B, with further reference to FIG. 11A, a diagram 1150 of example OFDM symbols for JCS operations with a plurality of SCS is shown. The diagram 1150 depicts a portion of the mixed numerology slot 1008 described in FIG. 10. The configuration of the mixed numerology may be provided to the UE via known signaling techniques such as Radio Resource Control (RRC), Medium Access Control Control Elements (MAC-CE), and/or Downlink Control Information (DCI). The OFDM symbols utilize a first SCS ($f_1$) and a relatively larger second SCS ($f_2$). In the mixed numerology, communication payload or reference signals may be flexibly multiplexed with the RF sensing reference signals. For example, the first, third and fourth symbols 1102*a*, 1102*c*, 1102*d* may be based on the first SCS and may be configured for communication signals, or other operations. The period previously allocated for the second symbol 1102*b* is configured for the second SCS and includes four symbols, for example, configured for RF sensing operations. In an example, the first SCS may be 30 kHz (e.g., T1=33.3 μs) and the second SCS may be 120 kHz (e.g., T2=8.33 μs). Other SCSs may be used. The UE may be configured to receive a first portion 1156*a* of a first symbol 1152*a*, a second portion 1156*b* of a second symbol 1152*b*, a third portion 1156*c* of a third symbol 1152*c*, and a fourth portion 1156*d* of a fourth symbol 1152*d*. Referring to FIG. 11C, the UE may be configured to perform a channel stitching operation 1158 to obtain the full bandwidth signal. For example, the UE may be configured to buffer the tones of the portions 1156*a-d* and then process all of the tones with a large FFT size. With the channel stitching operation 1158, the UE may achieve higher-resolution range estimation based on the system bandwidth 1104. Thus, the UE receives the system bandwidth 1104 over the duration of four symbols at the second SCS. Continuing the example where T1=33.3 μs in FIG. 11A, and T2=8.33 μs FIG. 11B, the UE may obtain the RF sensing signals using the mixed numerology of diagram 1150 in one quarter of the time required in the single numerology of diagram 1100.

Figure 12A:
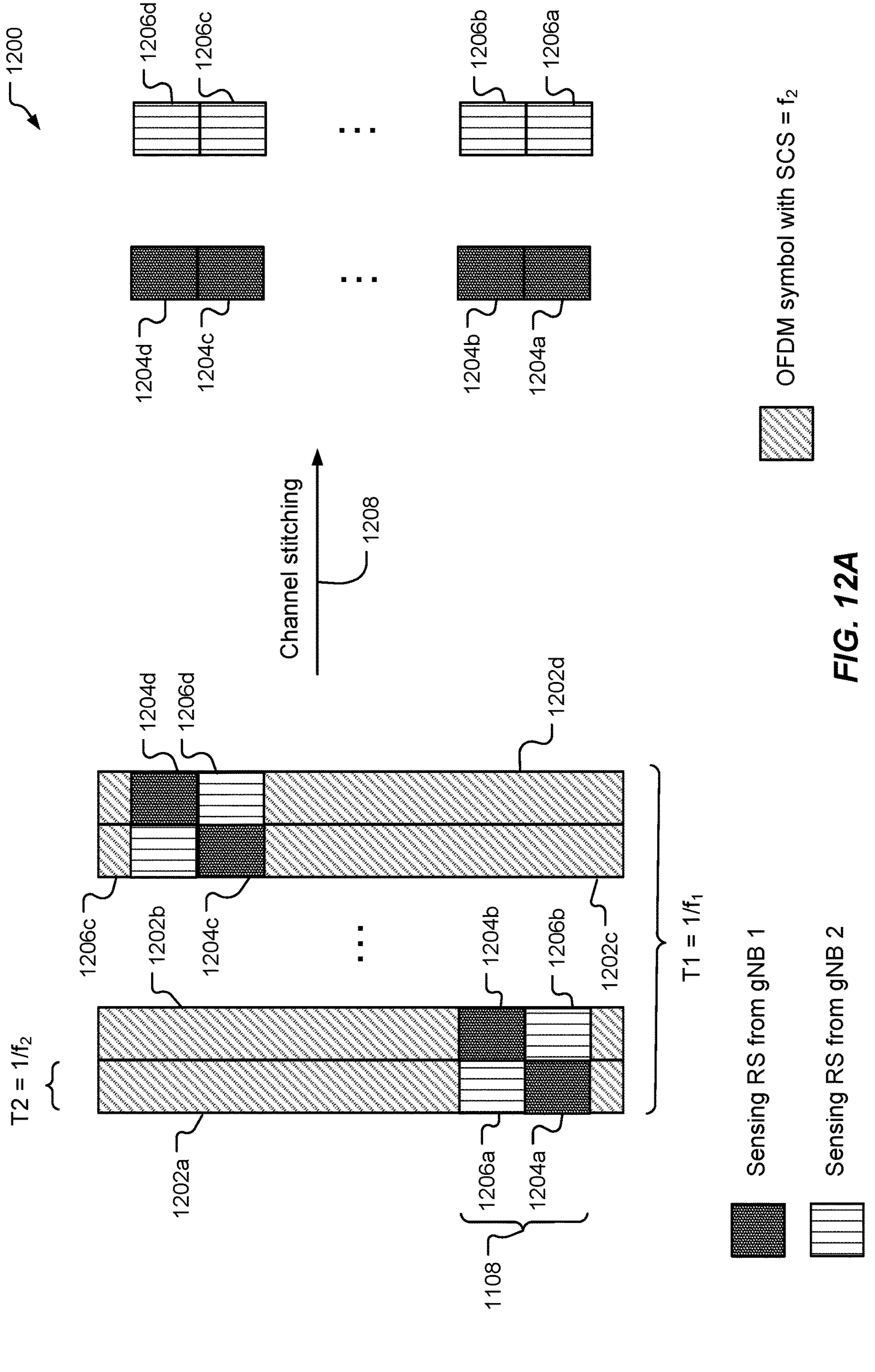
FIGS. 12A-12C are diagrams of examples of intra-symbol multiplexing of radio frequency sensing reference signals.
Figure 12B:
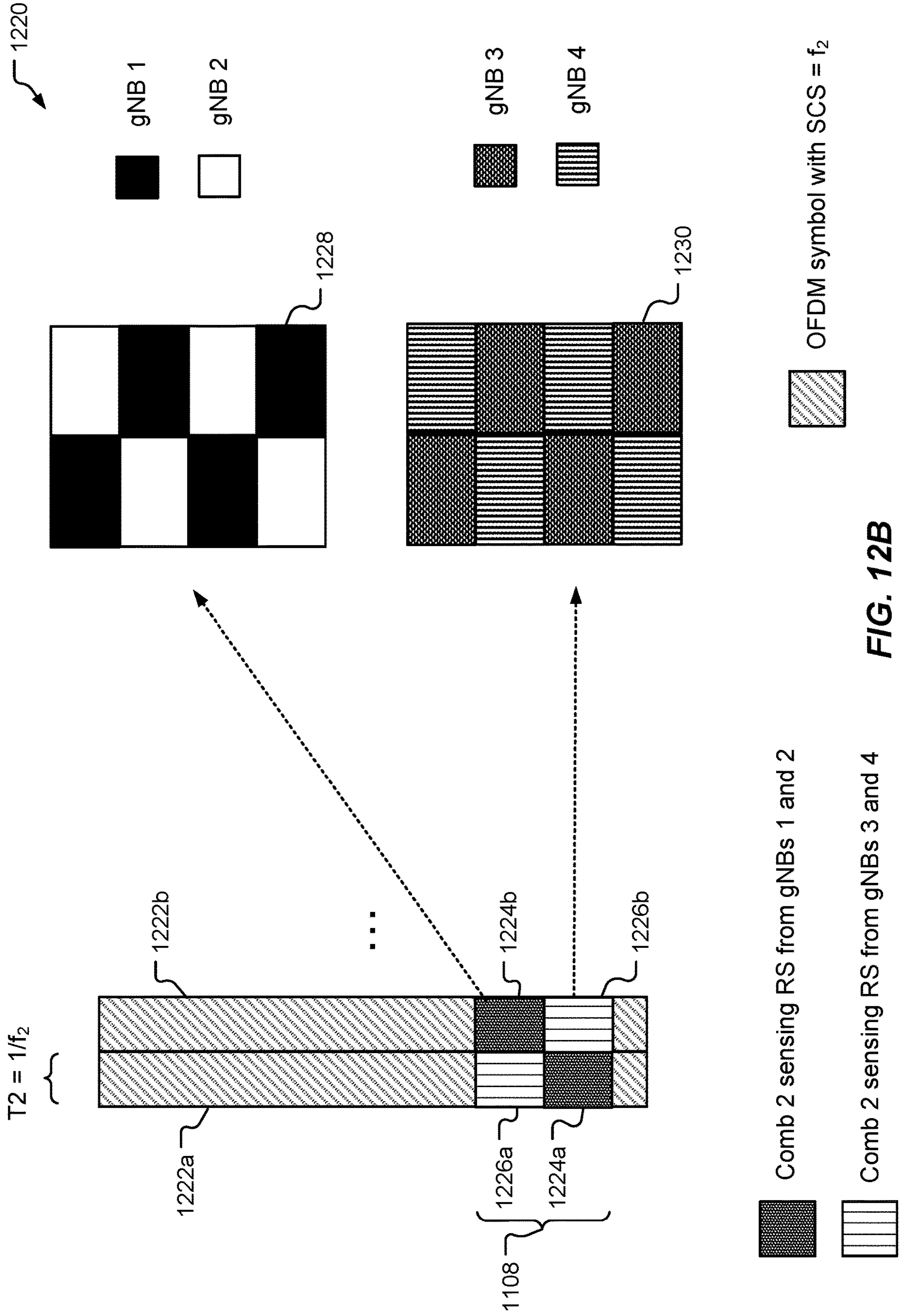
Figure 12C:
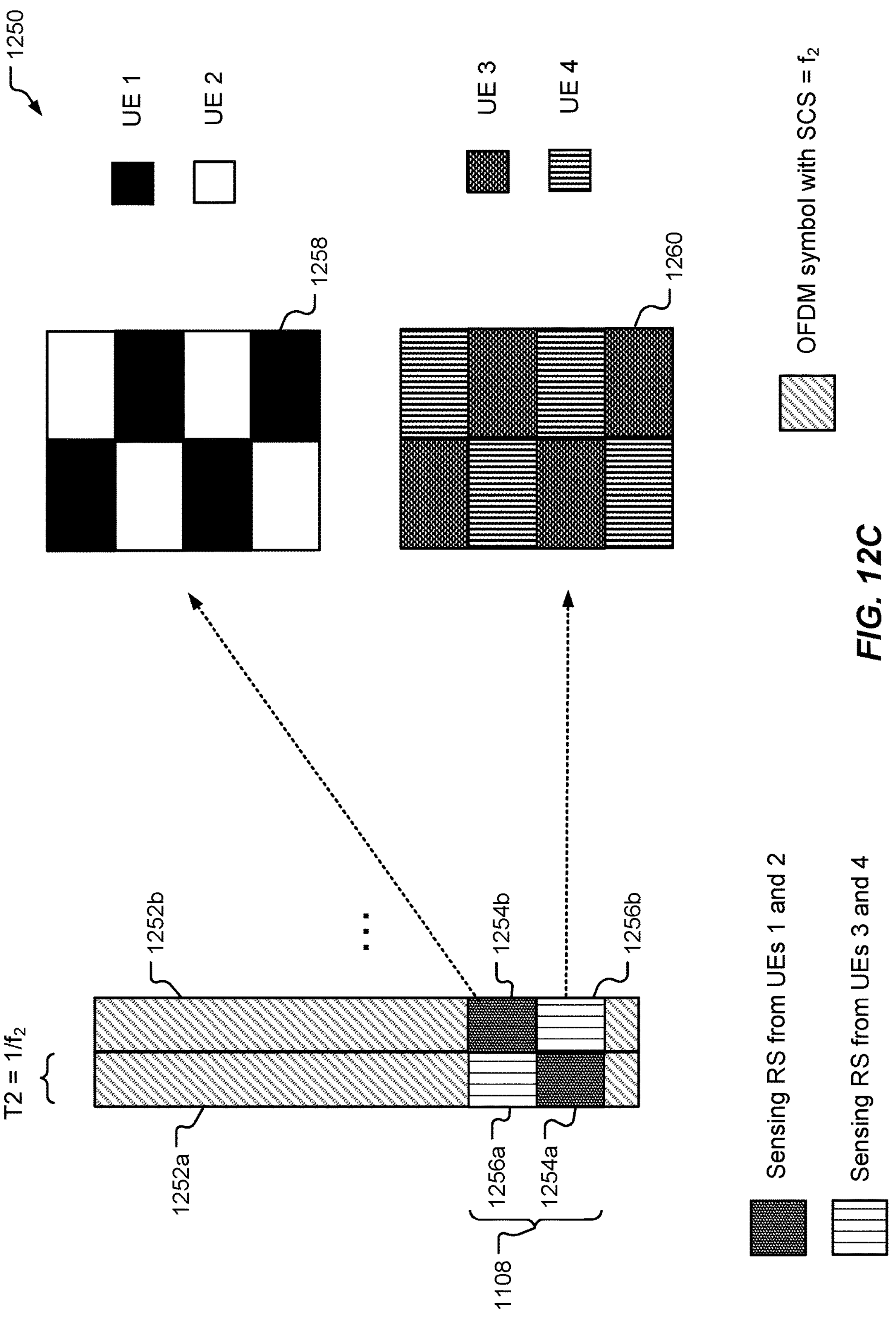

Referring to FIGS. 12A-12C, diagrams of example intra-symbol multiplexing of radio frequency sensing reference signals are shown. The JCS symbols described in FIG. 11B may be multiplexed using known comb-based designs to enable multiple gNBs and/or multiple UEs to send and receive RF sensing symbols. The symbols depicted in FIGS. 12A-12C correspond to the second SCS (e.g., SCS=$f_2$) described in FIG. 11B. In an example, referring to FIG. 12A, an example NR PRS comb-based design 1200 may be adopted to reduce interference and near-far effects. The comb design may be across multiple symbols and in the RE level. A first symbol 1202*a* may include a first set of REs 1204*a* for RF sensing signals transmitted from a first gNB, and a second set of REs 1206*a* for RF sensing signals transmitted from a second gNB. The REs 1204*a*, 1206*a* are within the limited bandwidth 1108 capabilities of the UE. A second symbol 1202*b* includes a first set of REs 1204*b* for the RF sensing signals transmitted from the first gNB, and a second set of REs 1206*b* for the RF sensing signals transmitted from the second gNB. Additional symbols may also include the multiplexed RF sensing REs in different areas of the system bandwidth as described herein. For example, a third symbol 1202*c* and a fourth symbol 1202*d* may have the respective sets of REs 1204*c-d*, 1206*c-d* containing the RF sensing symbols for the respective first and second gNBs. The receiving UE may be configured to perform comb-based intra-symbol channel stitching operations 1208 based of the respective RE sets 1204*a-d*, 1206*a-d*. Additional symbols, REs, and comb designs may also be used to multiplex the sensing reference signals transmitted by different gNBs.

In an example, referring to FIG. 12B, the capacity of RF sensing may be increased with RE level comb structures. A diagram 1220 of two example JCS symbols 1222*a*, 1222*b* with intra-symbol multiplexing of sensing reference signals transmitted by four gNBs is shown. For example, a first set of REs 1224*a*, 1224*b* may each include a first RE comb 1228 with RF sensing signals transmitted from a first gNB and a second gNB, and a second set of REs 1226*a*, 1226*b* may each include a second RE comb 1230 with RF sensing signals transmitted from a third gNB and a fourth gNB. The number of gNBs (e.g., stations), RE sets, and RE comb structures are examples, and not limitations, as other REs within a symbol and comb structures may be used to multiplex sensing reference signals transmitted by a plurality of gNBs.

In an example, referring to FIG. 12C, intra-symbol multiplexing may be used by a plurality of UEs transmitting UL sensing reference signals. For example, the UEs may be configured to transmit UL SRS and/or UL SRS for positioning signals to one or more neighboring stations or neighboring UEs. In an example, the sensing reference signals may be transmitted via sidelink (SL) protocols. A diagram 1250 of two example JCS UL or SL symbols 1252*a*, 1252*b* with intra-symbol multiplexing of sensing reference signals transmitted by four UEs. For example, a first set of REs 1254*a*, 1254*b* may each include a first RE comb 1258 with RF sensing signals transmitted from a first UE and a second UE, and a second set of REs 1256*a*, 1256*b* may each include a second RE comb 1260 with RF sensing signals transmitted from a third UE and a fourth UE. The number of UEs, RE sets, and RE comb structures are examples, and not limitations, as other REs within a symbol and comb structures may be used to multiplex sensing reference signals transmitted by a plurality of UEs.

The intra-symbol multiplexing described herein may provide additional technical advantages such as ensuring phase coherence across the sensing RS since all instances (e.g., narrow band RS across time) are transmitted within a single symbol duration. The latency of target localization may also be reduced because a sufficient number of range estimations to compute triangulation may be measured within a single symbol duration.

Figure 13:
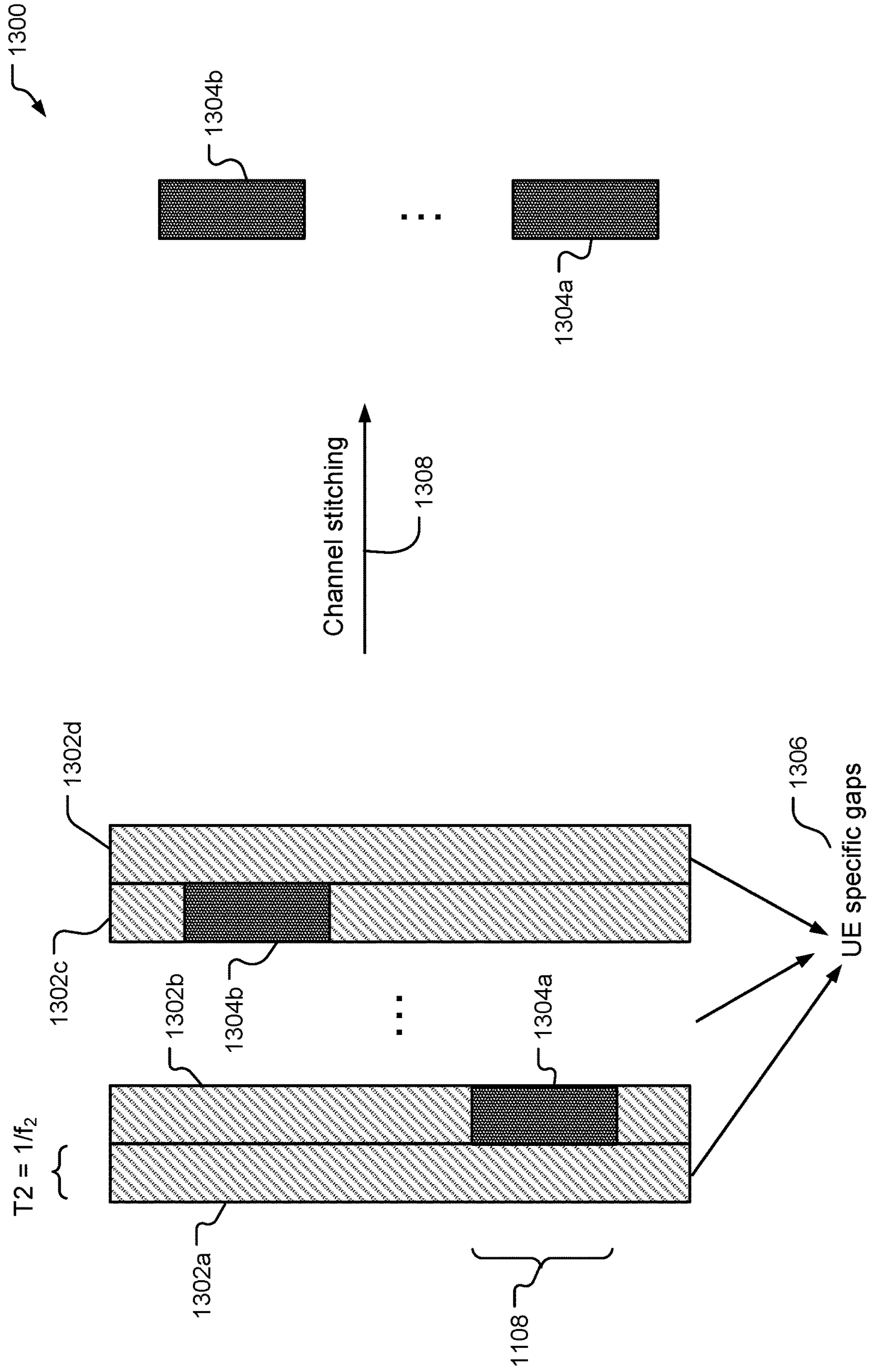
FIG. 13 is a diagram of example of tuning gaps for joint communication and sensing operations.

Referring to FIG. 13, a diagram 1300 of example tuning gaps for JCS operations is shown. The diagram 1300 includes example symbols 1302*a-d*, which are based on the second SCS (e.g., SCS=$f_2$) as described in FIG. 11B. UEs within a network may have different configurations and may have different tuning time capabilities. For example, some UEs may be configured to tune from one segment of the system bandwidth to another segment within the duration of the cyclic prefix (CP) of a symbol. Other UEs, however, may require additional time to retune from segment to segment. JCS configuration information (e.g., assistance data) may include UE specific tuning gap information in addition to the mixed numerology and intra-symbol multiplexing information as described herein. The tuning gap information may define UE specific gaps 1306 based on a number of symbols the UE will require to retune. For example, a UE may receive a first set of REs 1304*a* in a first symbol 1302*b* and a second set of REs 1304*b* in a second symbol 1302*c*. One or more symbols may be disposed between the first and second symbols 1302*b*, 1302*c* to allow the UE to retune from receiving the first set of REs 1304*a* to receiving the second set of REs 1304*b*. The UE may perform a channel stitching operation 1308 based on the received REs 1304*a*, 1304*b*. In an example, other UEs may be scheduled during the gap for RF sensing operations and/or other payload exchanges.

Figure 14:
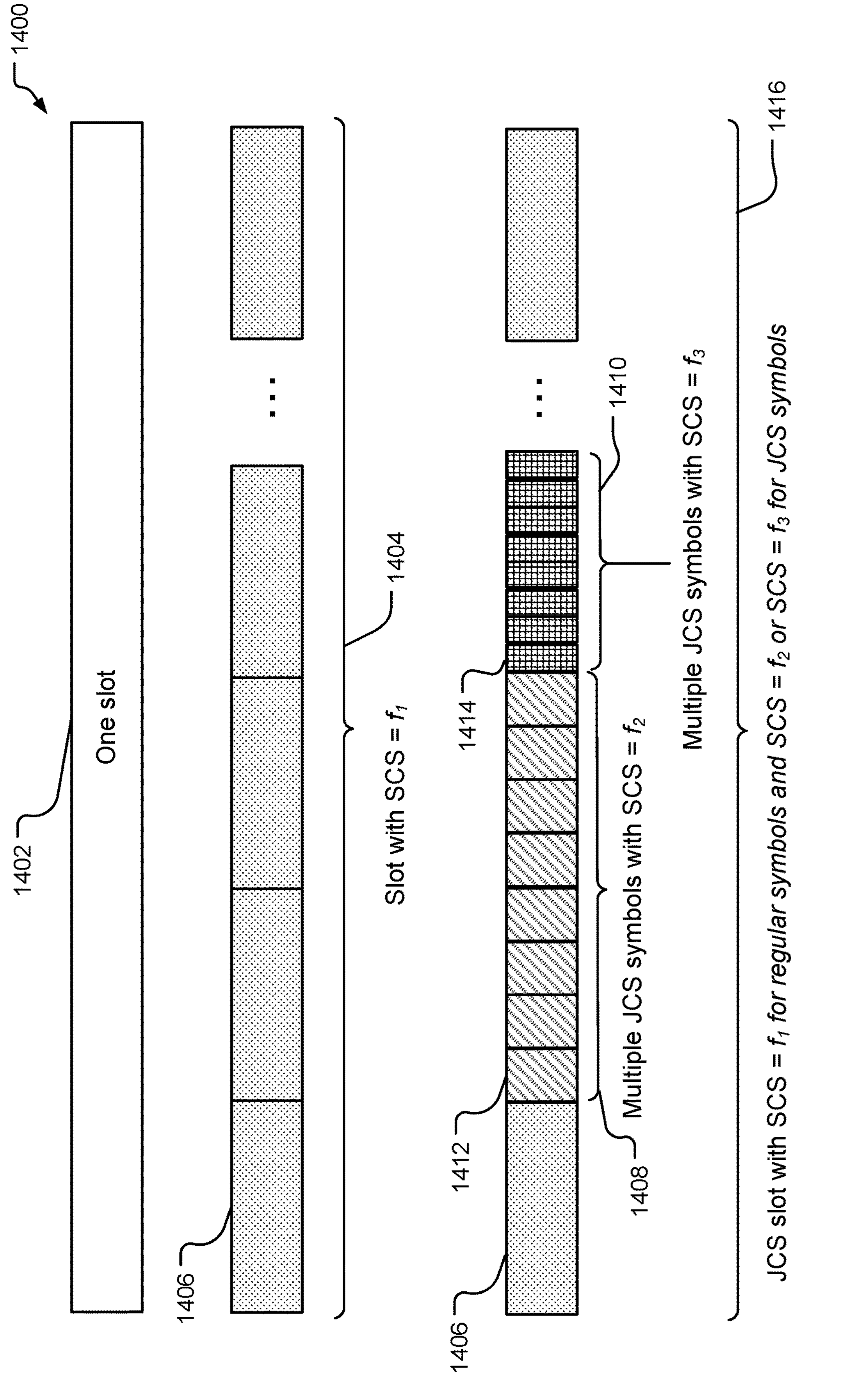
FIG. 14 is a second example mixed numerology for joint communication and sensing.

Referring to FIG. 14, a second example mixed numerology for joint communication and sensing is shown. A numerology diagram 1400 depicts example slots 1402 with various mixed symbol durations associated with different subcarrier spacing values. A first numerology 1404 may be based on a first SCS ($f_1$) and may comprise symbols having a first duration in time 1406. For example, the first numerology 1404 may utilize a SCS of 30 kHz with a symbol duration of 33.3 μs. For JCS operations, a mixed numerology slot 1416 may be configured with symbols of different durations associated with a plurality of SCSs. In an example, a JCS slot may include one or more symbols based the on the first SCS ($f_1$), including symbols having the first duration in time 1406, a second numerology 1408 with one or more symbols based on a second SCS ($f_2$) comprising symbols having a second duration in time 1412, which is less than the first duration in time 1406, and a third numerology 1410 with one or more symbols based on a third SCS ($f_3$)

comprising symbols having a third duration in time 1414, which is less than the second duration in time 1412. For example, the second numerology 1408 may utilize a SCS of 120 kHz with a symbol duration of 8.33 μs, and the third numerology 1410 may utilize a SCS of 240 kHz with a symbol duration of 4.46 μs. In an example, a single symbol could be extended with a mixed numerology to multiple consecutive symbols. For example, the second numerology 1408 occupies the duration of two symbols based on the first numerology 1404. Such a configuration may be used, for example, to enable additional tuning gaps based on the capabilities of the UE. In operation, the first SCS ($f_1$) may be used for communication symbols and the second SCS ($f_2$) and/or third SCS ($f_3$) may be used for RF sensing operations and/or synchronization signals. The number of different numerologies and symbol durations in the diagram 1400 are examples, and not limitations, as other numerologies and symbol durations may also be used for JCS operations.

Figure 15:
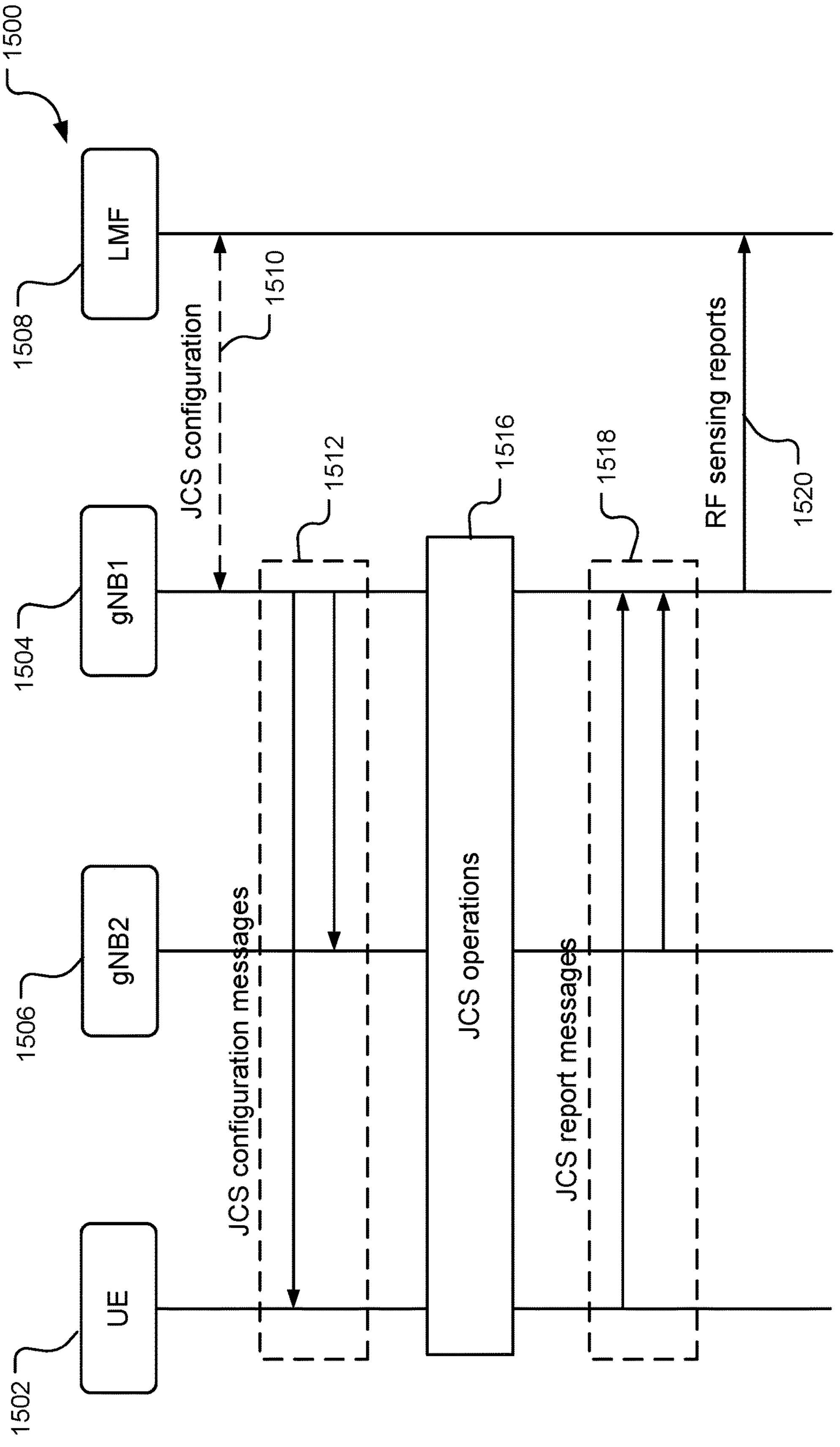
FIG. 15 is an example message flow diagram for providing radio frequency sensing configuration information.

Referring to FIG. 15, an example message flow diagram 1500 for providing RF sensing configuration information is shown. The message flow diagram 1500 includes example nodes in the communication system such as an UE 1502, a first gNB 1504, a second gNB 1506, and a network server such as a LMF 1508. The nodes and messages in the message flow diagram 1500 are examples, and not limitations, as other nodes and messages may be used to disseminate RF sensing configuration information throughout the communications system 100. The LMF 1508 may communicate with the gNBs 1504, 1506 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the first gNB 1504 (or the second gNB 1506) and the LMF 1508. The LMF 1508 and the UE 1502 may communicate using an LTE Positioning Protocol (LPP), which may be defined in 3GPP TS 36.355. The LMF 1508 and the UE 1502 may also or instead communicate using a New Radio Positioning Protocol (which may be referred to as NPP or NRPP), which may be the same as, similar to, or an extension of LPP. Here, LPP and/or NPP messages may be transferred between the UE 1502 and the LMF 1508 via the serving gNB (e.g., the first gNB 1504).

Each of the gNBs 1504, 1506 may include a radio unit (RU), a distributed unit (DU), and a central unit (CU) (not shown in FIG. 15). The RU, DU, and CU may be configured to divide the functionality of a gNB. An interface between the CU and the DU is referred to as an F1 interface. The Xn interface may be used for communications between the different gNBs 1504, 1506. The RU is configured to perform digital front end (DFE) functions (e.g., analog-to-digital conversion, filtering, power amplification, transmission/reception) and digital beamforming, and includes a portion of the physical (PHY) layer. The RU may perform the DFE using massive multiple input/multiple output (MIMO) and may be integrated with one or more antennas of the gNBs. The DU may host the Radio Link Control (RLC), Medium Access Control (MAC), and physical layers of a gNB. One DU can support one or more cells, and each cell is supported by a single DU. The operation of the DU may be controlled by the CU. The CU may be configured to perform functions for transferring user data, mobility control, radio access network sharing, positioning, session management, etc. although some functions are allocated exclusively to the DU. The CU may host the Radio Resource Control (RRC), Service Data Adaptation Protocol (SDAP), and Packet Data Convergence Protocol (PDCP) protocols of the gNB. The UE 1502 may communicate with the CU via RRC, SDAP, and PDCP layers, with the DU via the RLC, MAC, and PHY layers, and with the RU via the PHY layer.

In operation, the first gNB 1504 and the LMF 1508 may be configured to exchange one or more JCS configuration messages 1510 via the NPPa to establish the JCS configuration requirements. For example, the mixed numerologies for the JCS waveforms such as the OFDM configurations for at least a first SCS and a second SCS as depicted in FIG. 10 and FIG. 14 may be included in the JCS configuration messages 1510. Intra-symbol multiplexing configuration information, such as depicted in FIGS. 12A-12C, and tuning gap information, such as depicted in FIG. 13, may be included in the JCS configuration messages. In an example, the UE 1502 may be configured to provide one or more capabilities messages to the serving gNB (e.g., the first gNB 1504) and/or the LMF 1508 and the JCS configuration information may be based at least in part on the capabilities of the UE 1502. For example, the JCS configuration may include UE specific tuning gap information, such as depicted in FIG. 13. At stage 1512, the first gNB 1504 may be configured to provide one or more JCS configuration messages to network nodes such as the UE 1502 and the second gNB 1506. The JCS configuration messages may include indications of the mixed numerology, gap information, and other sensing reference signal multiplexing configurations as previously described. The first gNB 1504 may utilize over-the-air signaling protocols such as RRC, DCI and Medium Access Control (MAC) Control Elements (CE) for providing the JCS configuration information to the UE 1502. The first gNB 1504 may also provide the JCS configuration information to the second gNB 1506 via backhaul messaging such as the Xn interface.

At stage 1516, one or more network nodes may perform JCS operations and may utilize the JCS configuration information to enable their respective receiving systems to retune between configurations associated with communications signals, and configurations for RF sensing operations. The RF sensing operations may be based on the channel stitching techniques as described at FIGS. 11A-11C, and 12A-12C. At stage 1518, the network nodes may report JCS results such as distance and bearing information associated with a target object, or other signal indicators such as TOAs, and received signal strengths for one or more stitched RF sensing signals. At stage 1520, the first gNB 1504 may be configured to provide RF sensing reports to a network server, such as the LMF 1508. The RF sensing reports may be based on the measurements included in the report messages received at stage 1518, as well as measurements obtained by the first gNB 1504.

Figure 16:
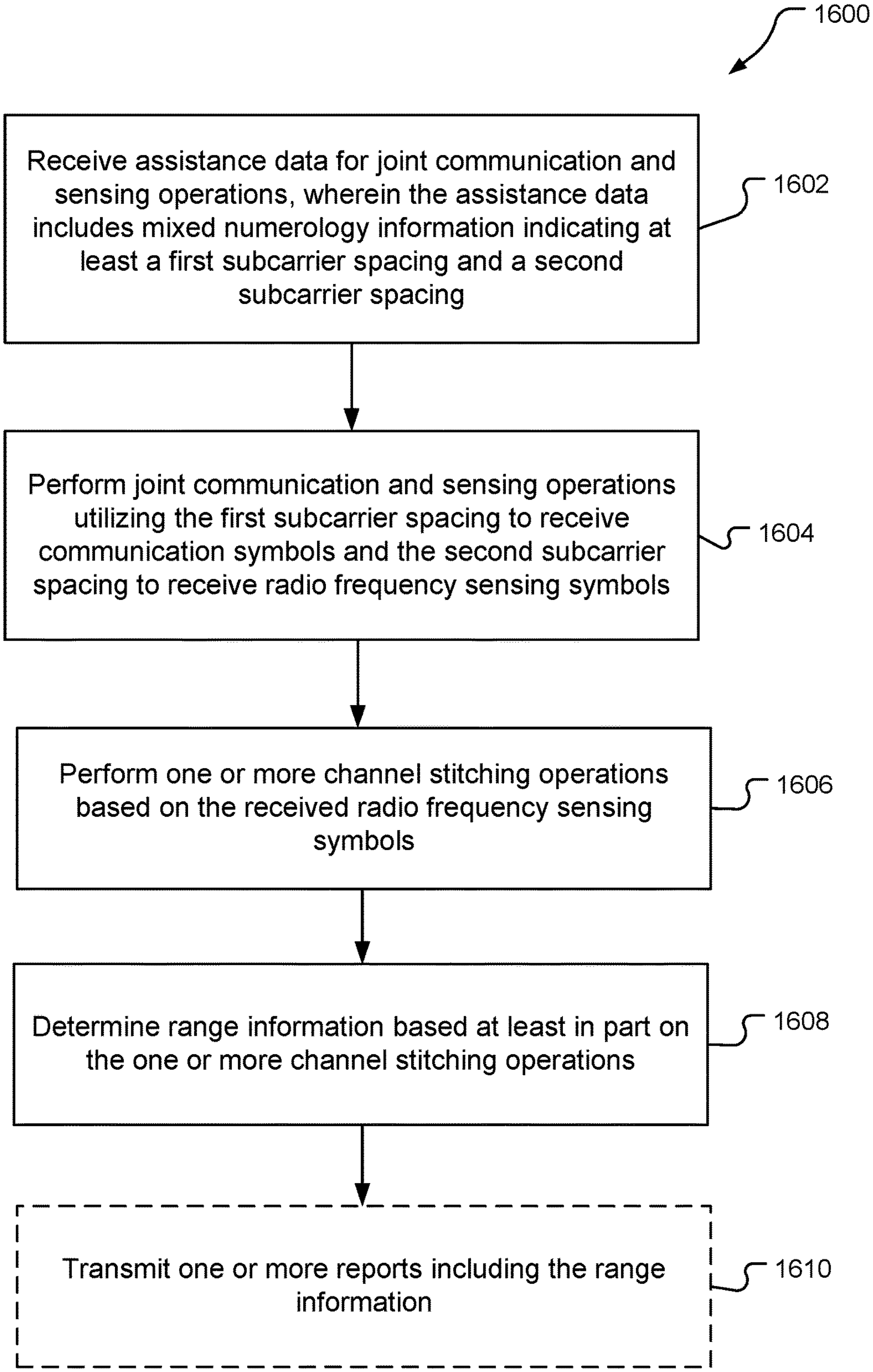
FIG. 16 is an example process flow diagram of a method for determining range information using joint communication and sensing.

Referring to FIG. 16, with further reference to FIGS. 1-15, a method 1600 for determining range information using joint communication and sensing includes the stages shown. A UE 302 or a base station 304, or other wireless nodes described herein, may be configured to transmit and/or receive JCS signals. The method 1600 is, however, an example and not limiting. The method 1600 may be altered, e.g., by having stages added, removed, rearranged, combined, performed concurrently, and/or having single stages split into multiple stages. For example, transmitting a report with range information at stage 1610 is optional.

At stage 1602, the method includes receiving assistance data for joint communication and sensing operations, wherein the assistance data includes mixed numerology information indicating at least a first subcarrier spacing and a second subcarrier spacing. A UE 302, including one or more transceivers 310, 320, and a processing system 332, is a means for receiving the assistance data for JCS operations. In an example, the assistance data may be included in one or more JCS communication messages received from a base station, such as a gNB. The assistance data may include the mixed numerologies for the JCS waveforms such as the OFDM configurations for at least a first SCS and a second SCS as depicted in FIG. 10 and FIG. 14. The assistance data may include intra-symbol multiplexing configuration information, such as depicted in FIGS. 12A-12C, and tuning gap information, such as depicted in FIG. 13. In an example, the assistance data may be received via over-the-air signaling protocols such as RRC (e.g., one or more System Information Blocks (SIBs)), DCI and/or MAC-CE signaling. Other signaling techniques may also be used to receive the assistance data.

At stage 1604, the method includes performing joint communication and sensing operations utilizing the first subcarrier spacing to receive communication symbols and the second subcarrier spacing to receive radio frequency sensing symbols. The UE 302, including the one or more transceivers 310, 320, the processing system 332, and the RF sensing components 342, is a means for performing JCS operations. In an example, referring to FIG. 11B, network stations such as gNBs may be configured to transmit communications and other data payloads via OFDM symbols utilizing a first SCS ($f_1$). The network stations may also be configured to transmit RF sensing signals via a relatively larger second SCS ($f_2$). The communication and other data payloads may be flexibly multiplexed with the RF sensing reference signals. The UE may utilize the assistance data received at stage 1602 to receive, for example, the communications and other data payloads on the first, third and fourth symbols 1102*a*, 1102*c*, 1102*d* based on the first SCS, and the sensing reference signals in the symbols based on the second SCS. For example, the UE may be configured to receive the first portion 1156*a* of the first symbol 1152*a*, the second portion 1156*b* of the second symbol 1152*b*, the third portion 1156*c* of the third symbol 1152*c*, and the fourth portion 1156*d* of the fourth symbol 1152*d*. In an example, the portions 1156*a-d* may be configured for intra-symbol multiplexing to enable detection of sensing reference signals from a plurality of network stations.

At stage 1606, the method includes performing one or more channel stitching operations based on the received radio frequency sensing symbols. The UE 302, including one or more transceivers 310, 320, and a processing system 332, is a means for performing the one or more channel stitching operations. In an example, the UE may be configured to buffer the tones of the portions 1156*a-d* and then process all of the tones with a large FFT size to obtain the full bandwidth signal. The channel stitching operation may also be configured to stitch intra-symbol multiplexed sensing reference signals as described in FIGS. 12A-12C.

At stage 1608, the method includes determining range information based at least in part on the one or more channel stitching operations. The UE 302, including one or more transceivers 310, 320, and a processing system 332, is a means for determining the range information. In an example, the range information includes time of arrival information for the sensing reference signals based on the alignment of the channel stitching operations. The UE may be configured to determine timing information for a plurality of channel taps (e.g., LOS and NLOS paths), such as described in FIGS. 4 and 5. In an example, the range information may be based on the time of flight of the sensing reference signals (e.g., the difference between the transmit and receive times) times the speed of light. Other range and location determination techniques, such as signal strength and angle of arrival, may also be used.

At stage 1610, the method optionally includes transmitting one or more reports including the range information. The UE 302, including one or more transceivers 310, 320, and a processing system 332, is a means for transmitting the one or more reports. In an example the UE may transmit one or more JCS report messages including the range information to a gNB and/or a network server such as the LMF. The JCS report messages may include JCS results such as distance and bearing information associated with a target object, or other signal indicators such as TOAs, and received signal strengths for one or more stitched RF sensing signals.

Figure 17:
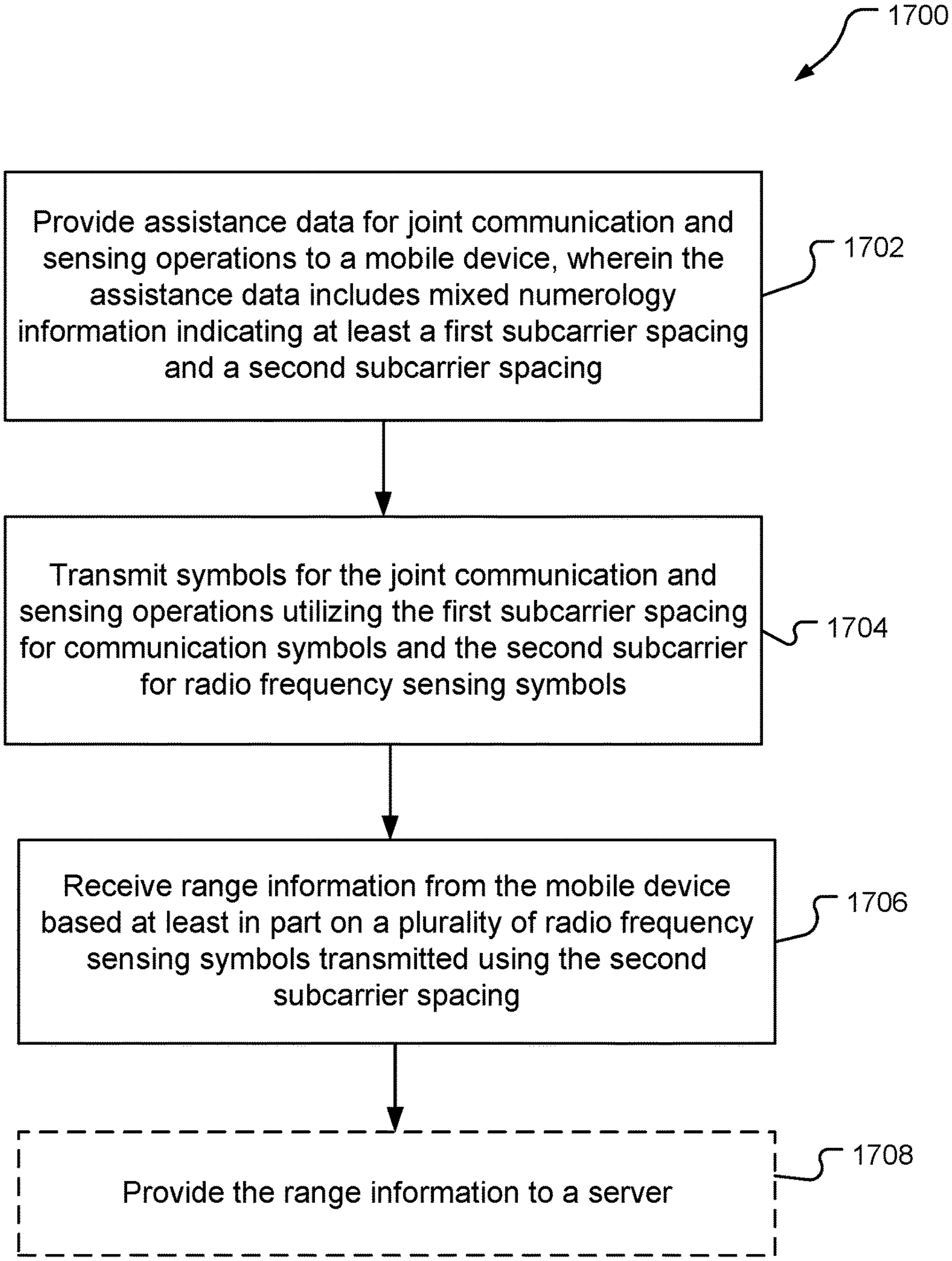
FIG. 17 is an example process flow diagram of a method for receiving range information from a mobile device based on joint communication and sensing.

Referring to FIG. 17, with further reference to FIGS. 1-15, a method 1700 for receiving range information from a mobile device based on joint communication and sensing includes the stages shown. A UE 302 or a base station 304, or other wireless nodes described herein, may be configured to transmit and/or receive JCS signals. The method 1700 is, however, an example and not limiting. The method 1700 may be altered, e.g., by having stages added, removed, rearranged, combined, performed concurrently, and/or having single stages split into multiple stages. For example, providing the range information to a server at stage 1708 is optional.

At stage 1702, the method includes providing assistance data for joint communication and sensing operations to a mobile device, wherein the assistance data includes mixed numerology information indicating at least a first subcarrier spacing and a second subcarrier spacing. A base station 304, including one or more transceivers 350, 360 and a processing system 384, is a means for providing assistance data. In an example, the assistance data may be included in one or more JCS communication messages transmitted from the base station, such as the first gNB 1504. The assistance data may include the mixed numerologies for the JCS waveforms such as the OFDM configurations for at least a first SCS and a second SCS as depicted in FIG. 10 and FIG. 14. The assistance data may include intra-symbol multiplexing configuration information, such as depicted in FIGS. 12A-12C, and tuning gap information, such as depicted in FIG. 13. In an example, the assistance data may be provided via over-the-air signaling protocols such as RRC (e.g., one or more System Information Blocks (SIBs)), DCI and/or MAC-CE signaling. Other signaling techniques may also be used to provide the assistance data.

At stage 1704, the method includes transmitting symbols for the joint communication and sensing operations utilizing the first subcarrier spacing for communication symbols and the second subcarrier frequency for radio frequency sensing symbols. The base station 304, including one or more transceivers 350, 360 and the processing system 384, is a means for transmitting symbols for JCS operations. Referring to FIG. 11B, for example, the base stations may be configured to transmit communications and other data payloads via OFDM symbols utilizing a first SCS ($f_1$). The network stations may also be configured to transmit RF sensing signals via a relatively larger second SCS ($f_2$). The communication and other data payloads may be flexibly multiplexed with the RF sensing reference signals. The base stations transmit, for example, the communications and other data payloads on the first, third and fourth symbols 1102*a*, 1102*c*, 1102*d* based on the first SCS, and the sensing reference signals in the symbols based on the second SCS. The symbols in the second SCS (e.g., 1152*a-d*) may include a sensing reference signal, such as a PRS or other reference signals (e.g., SSBs, PSS, CRS, etc.). In an example, the symbols 1152*a-d* may be configured for intra-symbol multiplexing to enable transmission of sensing reference signals from a plurality of network stations.

At stage 1706, the method includes receiving range information from the mobile device based at least in part on a plurality of radio frequency sensing symbols transmitted using the second subcarrier spacing. The base station 304, including one or more transceivers 350, 360 and the processing system 384, is a means for receiving range information. In an example, referring to FIG. 11B, a mobile device may be configured to receive the first portion 1156*a* of the first symbol 1152*a*, the second portion 1156*b* of the second symbol 1152*b*, the third portion 1156*c* of the third symbol 1152*c*, and the fourth portion 1156*d* of the fourth symbol 1152*d*, and perform a channel stitching operation to determine the range information. The range information may be based on timing information for a plurality of channel taps (e.g., LOS and NLOS paths) received by the mobile device. The mobile device may transmit one or more JCS report messages including the range information via RRC signaling. Other signaling methods, such as DCI and MAC-CE may be used to transmit the range information. In an example, the range information may include JCS results such as distance and bearing information associated with a target object, or other signal indicators such as TOAs, and received signal strengths for one or more stitched RF sensing signals.

At stage 1708, the method optionally includes providing the range information to a server. The base station 304, including one or more transceivers 350, 360 and the processing system 384, is a means for providing the range information. The base station may be configured to provide one or more RF sensing reports to a network server, such as the LMF or other network stations. The RF sensing reports may be based on the range information received from the mobile device at stage 1706, as well as measurements obtained by neighboring base stations and reported via the Xn interface.

The methods 1600 and 1700 may be performed by different wireless nodes in a communication network, including base stations and mobile devices. In an example, the wireless nodes may be configured to utilize a mixed numerology with sidelink protocols. For example, a first UE may be configured to provide assistance data and transmit communication and sensing reference signals to a second UE based on the mixed numerologies as described herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

Implementation examples are described in the following numbered clauses:

Clause 1. A method of determining range information using joint communication and sensing, comprising: receiving assistance data for joint communication and sensing operations, wherein the assistance data includes mixed numerology information indicating at least a first subcarrier spacing and a second subcarrier spacing; performing joint communication and sensing operations utilizing the first subcarrier spacing to receive communication symbols and the second subcarrier spacing to receive radio frequency sensing symbols; performing one or more channel stitching operations based on the received radio frequency sensing symbols; and determining range information based at least in part on the one or more channel stitching operations.

Clause 2. The method of clause 1 wherein the assistance data includes intra-symbol multiplexing configuration information, and performing the joint communication and sensing operations includes receiving radio frequency sensing symbols from a plurality of stations based at least in part on the intra-symbol multiplexing configuration information.

Clause 3. The method of clause 2 wherein an intra-symbol multiplexing configuration is a comb based configuration.

Clause 4. The method of clause 1 wherein the assistance data includes tuning gap information, and performing the joint communication and sensing operations includes receiving radio frequency sensing symbols based at least in part on the tuning gap information.

Clause 5. The method of clause 1 wherein the mixed numerology information further includes a third subcarrier spacing, and performing the joint communication and sensing operations includes receiving synchronization signal symbols based on the third subcarrier spacing.

Clause 6. The method of clause 1 wherein the radio frequency sensing symbols are positioning reference signals.

Clause 7. The method of clause 1 wherein determining the range information includes determining timing information for the radio frequency sensing symbols received via a line of sight path and at least one non-line of sight path.

Clause 8. The method of clause 1 further comprising transmitting one or more reports including the range information.

Clause 9. The method of clause 1 wherein the assistance data is received via radio resource control messaging, downlink control information messaging, medium access control messaging, or any combination thereof.

Clause 10. A method for receiving range information from a mobile device based on joint communication and sensing, comprising: providing assistance data for joint communication and sensing operations to the mobile device, wherein the assistance data includes mixed numerology information indicating at least a first subcarrier spacing and a second subcarrier spacing; transmitting symbols for the joint communication and sensing operations utilizing the first subcarrier spacing for communication symbols and the second subcarrier spacing for radio frequency sensing symbols; and receiving range information from the mobile device based at least in part on a plurality of radio frequency sensing symbols transmitted using the second subcarrier spacing.

Clause 11. The method of clause 10 wherein the mobile device is configured to receive signals based on a first bandwidth and transmitting the symbols for the joint communication and sensing operations utilizes a second bandwidth that is larger than the first bandwidth.

Clause 12. The method of clause 10 wherein the assistance data includes intra-symbol multiplexing configuration information, and transmitting the symbols for the joint communication and sensing operations includes transmitting radio frequency sensing symbols based at least in part on the intra-symbol multiplexing configuration information.

Clause 13. The method of clause 12 wherein an intra-symbol multiplexing configuration is a comb based configuration.

Clause 14. The method of clause 10 wherein the assistance data includes tuning gap information, and transmitting the symbols for the joint communication and sensing operations includes transmitting radio frequency sensing symbols based at least in part on the tuning gap information.

Clause 15. The method of clause 10 wherein the mixed numerology information further includes a third subcarrier spacing, and transmitting the symbols for the joint communication and sensing operations includes transmitting synchronization signal symbols based on the third subcarrier spacing.

Clause 16. The method of clause 10 wherein the radio frequency sensing symbols are positioning reference signals.

Clause 17. The method of clause 10 wherein receiving the range information includes receiving timing information associated with the radio frequency sensing symbols received by a mobile device via a line of sight path and at least one non-line of sight path.

Clause 18. The method of clause 10 further comprising providing the range information to a server.

Clause 19. The method of clause 10 wherein the assistance data is provided via radio resource control messaging, downlink control information messaging, medium access control messaging, or any combination thereof.

Clause 20. An apparatus, comprising: a memory; at least one transceiver; at least one processor communicatively coupled to the memory and the at least one transceiver, and configure to: receive assistance data for joint communication and sensing operations, wherein the assistance data includes mixed numerology information indicating at least a first subcarrier spacing and a second subcarrier spacing; perform joint communication and sensing operations utilizing the first subcarrier spacing to receive communication symbols and the second subcarrier spacing to receive radio frequency sensing symbols; perform one or more channel stitching operations based on the received radio frequency sensing symbols; and determine range information based at least in part on the one or more channel stitching operations.

Clause 21. The apparatus of clause 20 wherein the assistance data includes intra-symbol multiplexing configuration information, and the at least one processor is further configured to receive radio frequency sensing symbols from a plurality of stations based at least in part on the intra-symbol multiplexing configuration information.

Clause 22. The apparatus of clause 21 wherein an intra-symbol multiplexing configuration is a comb based configuration.

Clause 23. The apparatus of clause 20 wherein the assistance data includes tuning gap information, and the at least one processor is further configured to receive radio frequency sensing symbols based at least in part on the tuning gap information.

Clause 24. The apparatus of clause 20 wherein the mixed numerology information further includes a third subcarrier spacing, and the at least one processor is further configured to receive synchronization signal symbols based on the third subcarrier spacing.

Clause 25. The apparatus of clause 20 wherein the radio frequency sensing symbols are positioning reference signals.

Clause 26. The apparatus of clause 20 wherein the at least one processor is further configured to determine timing information for the radio frequency sensing symbols received via a line of sight path and at least one non-line of sight path.

Clause 27. The apparatus of clause 20 wherein the at least one processor is further configured to transmit one or more reports including the range information.

Clause 28. The apparatus of clause 20 wherein the assistance data is received via radio resource control messaging, downlink control information messaging, medium access control messaging, or any combination thereof.

Clause 29. An apparatus, comprising: a memory; at least one transceiver; at least one processor communicatively coupled to the memory and the at least one transceiver, and configured to: provide assistance data for joint communication and sensing operations to a mobile device, wherein the assistance data includes mixed numerology information indicating at least a first subcarrier spacing and a second subcarrier spacing; transmit symbols for the joint communication and sensing operations utilizing the first subcarrier spacing for communication symbols and the second subcarrier spacing for radio frequency sensing symbols; and receive range information from the mobile device based at least in part on a plurality of radio frequency sensing symbols transmitted using the second subcarrier spacing.

Clause 30. The apparatus of clause 29 wherein the mobile device is configured to receive signals based on a first bandwidth and the symbols transmitted for the joint communication and sensing operations utilize a second bandwidth that is larger than the first bandwidth.

Clause 31. The apparatus of clause 29 wherein the assistance data includes intra-symbol multiplexing configuration information, and the at least one processor is further configured to transmit radio frequency sensing symbols based at least in part on the intra-symbol multiplexing configuration information.

Clause 32. The apparatus of clause 31 wherein an intra-symbol multiplexing configuration is a comb based configuration.

Clause 33. The apparatus of clause 29 wherein the assistance data includes tuning gap information, and the at least one processor is further configured to transmit radio frequency sensing symbols based at least in part on the tuning gap information.

Clause 34. The apparatus of clause 29 wherein the mixed numerology information further includes a third subcarrier spacing, and the at least one processor is further configured to transmit synchronization signal symbols based on the third subcarrier spacing.

Clause 35. The apparatus of clause 29 wherein the radio frequency sensing symbols are positioning reference signals.

Clause 36. The apparatus of clause 29 wherein the at least one processor is further configured to receive timing information associated with the radio frequency sensing symbols received by the mobile device via a line of sight path and at least one non-line of sight path.

Clause 37. The apparatus of clause 29 wherein the at least one processor is further configured to provide the range information to a server.

Clause 38. The apparatus of clause 29 wherein the at least one processor is further configured to provide the assistance data via radio resource control messaging, downlink control information messaging, medium access control messaging, or any combination thereof.

Clause 39. An apparatus for determining range information using joint communication and sensing, comprising: means for receiving assistance data for joint communication and sensing operations, wherein the assistance data includes mixed numerology information indicating at least a first subcarrier spacing and a second subcarrier spacing; means for performing joint communication and sensing operations utilizing the first subcarrier spacing to receive communication symbols and the second subcarrier spacing to receive radio frequency sensing symbols; means for performing one or more channel stitching operations based on the received radio frequency sensing symbols; and means for determining range information based at least in part on the one or more channel stitching operations.

Clause 40. An apparatus for receiving range information from a mobile device based on joint communication and sensing, comprising: means for providing assistance data for joint communication and sensing operations to the mobile device, wherein the assistance data includes mixed numerology information indicating at least a first subcarrier spacing and a second subcarrier spacing; means for transmitting symbols for the joint communication and sensing operations utilizing the first subcarrier spacing for communication symbols and the second subcarrier spacing for radio frequency sensing symbols; and means for receiving range information from the mobile device based at least in part on a plurality of radio frequency sensing symbols transmitted using the second subcarrier spacing.

Clause 41. A non-transitory processor-readable storage medium comprising processor-readable instructions configured to cause one or more processors to determine range information using joint communication and sensing, comprising code for: receiving assistance data for joint communication and sensing operations, wherein the assistance data includes mixed numerology information indicating at least a first subcarrier spacing and a second subcarrier spacing; performing joint communication and sensing operations utilizing the first subcarrier spacing to receive communication symbols and the second subcarrier spacing to receive radio frequency sensing symbols; performing one or more channel stitching operations based on the received radio frequency sensing symbols; and determining range information based at least in part on the one or more channel stitching operations.

Clause 42. A non-transitory processor-readable storage medium comprising processor-readable instructions configured to cause one or more processors to receive range information from a mobile device based on joint communication and sensing, comprising code for: providing assistance data for joint communication and sensing operations to the mobile device, wherein the assistance data includes mixed numerology information indicating at least a first subcarrier spacing and a second subcarrier spacing; transmitting symbols for the joint communication and sensing operations utilizing the first subcarrier spacing for communication symbols and the second subcarrier spacing for radio frequency sensing symbols; and receiving range information from the mobile device based at least in part on a plurality of radio frequency sensing symbols transmitted using the second subcarrier spacing.

What is claimed is:

1. A method of determining range information using joint communication and sensing, comprising:

receiving assistance data for joint communication and sensing operations, wherein the assistance data includes mixed numerology information indicating at least a first subcarrier spacing for a frequency range and one or more first symbols of a signal transmission slot and a second subcarrier spacing for the frequency range and a plurality of second symbols of the signal transmission slot, wherein the second subcarrier spacing is at least twice the first subcarrier spacing;

performing joint communication and sensing operations utilizing the first subcarrier spacing to receive communication symbols and the second subcarrier spacing to receive radio frequency sensing symbols;

performing one or more channel stitching operations based on the received radio frequency sensing symbols to produce a stitched sensing signal having a stitched bandwidth spanning a combination of bandwidths of the received radio frequency sensing symbols;

determining range information based at least in part on the one or more channel stitching operations; and transmitting an indicator of the determined range information.

2. The method of claim 1, wherein the assistance data comprises intra-symbol multiplexing configuration information, wherein performing the joint communication and sensing operations comprises:

receiving radio frequency sensing symbols from a plurality of stations based at least in part on the intra-symbol multiplexing configuration information.

3. The method of claim 2, wherein the intra-symbol multiplexing configuration information comprises information associated with a comb-based configuration.

4. The method of claim 1, wherein the assistance data comprises tuning gap information, wherein performing the joint communication and sensing operations comprises:

receiving radio frequency sensing symbols based at least in part on the tuning gap information.

5. The method of claim 1, wherein the radio frequency sensing symbols comprise positioning reference signals.

6. The method of claim 1, wherein transmitting the indicator of the determined range information comprises:

transmitting one or more reports comprising the range information.

7. A method for receiving range information from a mobile device based on joint communication and sensing, comprising:

providing assistance data for joint communication and sensing operations to the mobile device, wherein the assistance data includes mixed numerology information indicating at least a first subcarrier spacing for a frequency range and one or more first symbols of a signal transmission slot and a second subcarrier spacing for the frequency range and a plurality of second symbols of the signal transmission slot, wherein the second subcarrier spacing is at least twice the first subcarrier spacing;

transmitting symbols for the joint communication and sensing operations utilizing the first subcarrier spacing for communication symbols and the second subcarrier spacing for radio frequency sensing symbols;

receiving range information from the mobile device based at least in part on a plurality of radio frequency sensing symbols transmitted using the second subcarrier spacing; and transmitting an indicator of the received range information.

8. The method of claim 7, wherein the mobile device is configured to receive signals based on a first bandwidth, wherein transmitting the symbols for the joint communication and sensing operations comprises:

transmitting the symbols for the joint communication and sensing operations utilizing a second bandwidth that is larger than the first bandwidth.

9. The method of claim 7, wherein the assistance data comprises intra-symbol multiplexing configuration information, wherein transmitting the symbols for the joint communication and sensing operations comprises transmitting radio frequency sensing symbols based at least in part on the intra-symbol multiplexing configuration information.

10. The method of claim 9, wherein the intra-symbol multiplexing configuration information comprises information associated with a comb-based configuration.

11. The method of claim 7, wherein the assistance data comprises tuning gap information, wherein transmitting the symbols for the joint communication and sensing operations comprises transmitting radio frequency sensing symbols based at least in part on the tuning gap information.

12. The method of claim 7, wherein the radio frequency sensing symbols comprise positioning reference signals.

13. The method of claim 7, wherein transmitting the indicator of the determined range information comprises:

providing the range information to a server.

14. An apparatus, comprising:

memory;

at least one transceiver;

at least one processor communicatively coupled to the memory and the at least one transceiver, and configured to:

receive assistance data for joint communication and sensing operations, wherein the assistance data includes mixed numerology information indicating at least a first subcarrier spacing for a frequency range and one or more first symbols of a signal transmission slot and a second subcarrier spacing for the frequency range and a plurality of second symbols of the signal transmission slot, wherein the second subcarrier spacing is at least twice the first subcarrier spacing;

perform joint communication and sensing operations utilizing the first subcarrier spacing to receive communication symbols and the second subcarrier spacing to receive radio frequency sensing symbols;

perform one or more channel stitching operations based on the received radio frequency sensing symbols to produce a stitched sensing signal having a stitched bandwidth spanning a combination of bandwidths of the received radio frequency sensing symbols;

determine range information based at least in part on the one or more channel stitching operations; and transmit an indicator of the determined range information.

15. The apparatus of claim 14 wherein the assistance data comprises intra-symbol multiplexing configuration information, wherein, to perform the joint communication and sensing operation, the at least one processor is configured to:

receive radio frequency sensing symbols from a plurality of stations based at least in part on the intra-symbol multiplexing configuration information.

16. The apparatus of claim 15, wherein the intra-symbol multiplexing configuration information comprises information associated with a comb-based configuration.

17. The apparatus of claim 14, wherein the assistance data includes tuning gap information, wherein the at least one processor is further configured to:

receive radio frequency sensing symbols based at least in part on the tuning gap information.

18. The apparatus of claim 14, wherein the mixed numerology information further comprises a third subcarrier spacing, wherein the at least one processor is further configured to:

receive synchronization signal symbols based on the third subcarrier spacing.

19. The apparatus of claim 14, wherein the radio frequency sensing symbols comprise positioning reference signals.

20. The apparatus of claim 14, wherein the at least one processor is further configured to:

determine timing information for the radio frequency sensing symbols received via a line of sight path and at least one non-line of sight path.

21. The apparatus of claim 14, wherein, to transmit the indicator of the determined range information, the at least one processor is further configured to:

transmit one or more reports including the range information.

22. The apparatus of claim 14, wherein, to receive the assistance data, the at least one processor is configured to:

receive the assistance data via at least one of radio resource control messaging, downlink control information messaging, medium access control messaging, or any combination thereof.

23. The apparatus of claim 14, wherein, to perform one or more channel stitching operations based on the received radio frequency sensing symbols, the at least one processor is configured to:

perform the one or more channel stitching operations based only on the received radio frequency sensing symbols.

24. An apparatus, comprising:

memory;

at least one transceiver;

at least one processor communicatively coupled to the memory and the at least one transceiver, and configured to:

provide assistance data for joint communication and sensing operations to a mobile device, wherein the assistance data includes mixed numerology information indicating at least a first subcarrier spacing and a second subcarrier spacing that is at least twice the first subcarrier spacing;

transmit symbols for the joint communication and sensing operations utilizing the first subcarrier spacing for communication symbols and the second subcarrier spacing for radio frequency sensing symbols;

receive range information from the mobile device based at least in part on a plurality of radio frequency sensing symbols transmitted using the second subcarrier spacing; and transmit an indicator of the received range information.

25. The apparatus of claim 24, wherein the mobile device is configured to receive signals based on a first bandwidth, wherein, to transmit the symbols for the joint communication and sensing operations, the at least one processor is configured to:

transmit the symbols for the joint communication and sensing operations utilizing a second bandwidth that is larger than the first bandwidth.

26. The apparatus of claim 24, wherein the assistance data comprises intra-symbol multiplexing configuration information, wherein, to transmit the symbols for the joint communication and sensing operations, the at least one processor is configured to:

transmit radio frequency sensing symbols based at least in part on the intra-symbol multiplexing configuration information.

27. The apparatus of claim 26, wherein the intra-symbol multiplexing configuration information comprises information associated with a comb-based configuration.

28. The apparatus of claim 24, wherein the assistance data comprises tuning gap information, wherein, to transmit the symbols for the joint communication and sensing operations, the at least one processor is configured to:

transmit radio frequency sensing symbols based at least in part on the tuning gap information.

29. The apparatus of claim 24, wherein the at least one processor is further configured to:

receive timing information associated with the radio frequency sensing symbols received by the mobile device via a line of sight path and at least one non-line of sight path.

30. The apparatus of claim 24, wherein, to transmit the indicator of the determined range information, the at least one processor is configured to:

provide the range information to a server.

31. The apparatus of claim 24, wherein to provide the assistance data for joint communication and sensing operations, the at least one processor is further configured to:

provide the assistance data via radio resource control messaging, downlink control information messaging, medium access control messaging, or any combination thereof.

* * * * *